United States Patent
Amirsolaimani et al.

(10) Patent No.: US 11,635,645 B2
(45) Date of Patent: Apr. 25, 2023

(54) OPTICAL DEVICE INCLUDING FARADAY ROTATOR

(71) Applicant: Meta Platforms Technologies, LLC, Menlo Park, CA (US)

(72) Inventors: Babak Amirsolaimani, Redmond, WA (US); Weichuan Gao, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 646 days.

(21) Appl. No.: 16/810,529

(22) Filed: Mar. 5, 2020

(65) Prior Publication Data
US 2021/0116727 A1 Apr. 22, 2021

Related U.S. Application Data

(60) Provisional application No. 62/923,416, filed on Oct. 18, 2019.

(51) Int. Cl.
| | |
|---|---|
| *G02F 1/09* | (2006.01) |
| *G02B 27/01* | (2006.01) |
| *G02F 1/01* | (2006.01) |
| *G02B 5/30* | (2006.01) |
| *G02B 27/28* | (2006.01) |

(52) U.S. Cl.
CPC .............. *G02F 1/09* (2013.01); *G02B 5/3016* (2013.01); *G02B 27/0172* (2013.01); *G02B 27/283* (2013.01); *G02F 1/0136* (2013.01)

(58) Field of Classification Search
CPC ....... G02F 1/09; G02F 1/0136; G02B 5/3016; G02B 27/0172; G02B 27/283
See application file for complete search history.

(56) References Cited

U.S. PATENT DOCUMENTS

2019/0086669 A1* 3/2019 Percival ................ H01L 27/156

* cited by examiner

*Primary Examiner* — Darryl J Collins
*Assistant Examiner* — Tamara Y. Washington
(74) *Attorney, Agent, or Firm* — Morgan, Lewis & Bockius LLP

(57) ABSTRACT

An optical assembly includes a first polarization-sensitive reflector, a second polarization-sensitive reflector, and a Faraday rotator. The first polarization-sensitive reflector is positioned to transmit light having a first polarization, and reflect light having a second polarization that is orthogonal to the first polarization. The second polarization-sensitive reflector is positioned to reflect light having a third polarization that is different from the first polarization and the second polarization, and transmit light having a fourth polarization that is orthogonal to the third polarization. The Faraday rotator is disposed between the first polarization-sensitive reflector and the second polarization-sensitive reflector so that the Faraday rotator converts: (i) the light having the first polarization into the light having the third polarization, (ii) the light having the third polarization into the light having the second polarization, and (iii) the light having the second polarization into the light having the fourth polarization.

20 Claims, 21 Drawing Sheets

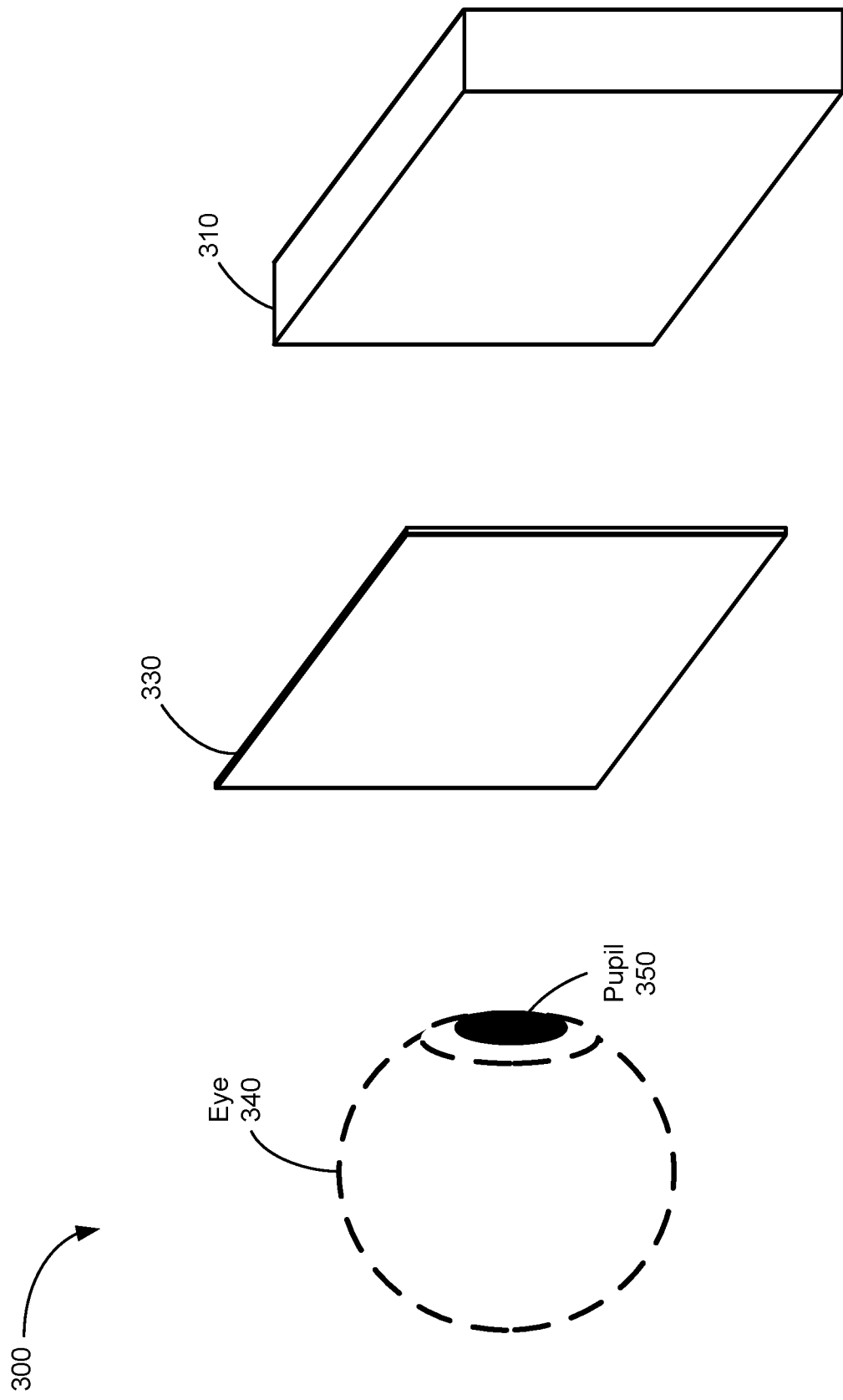

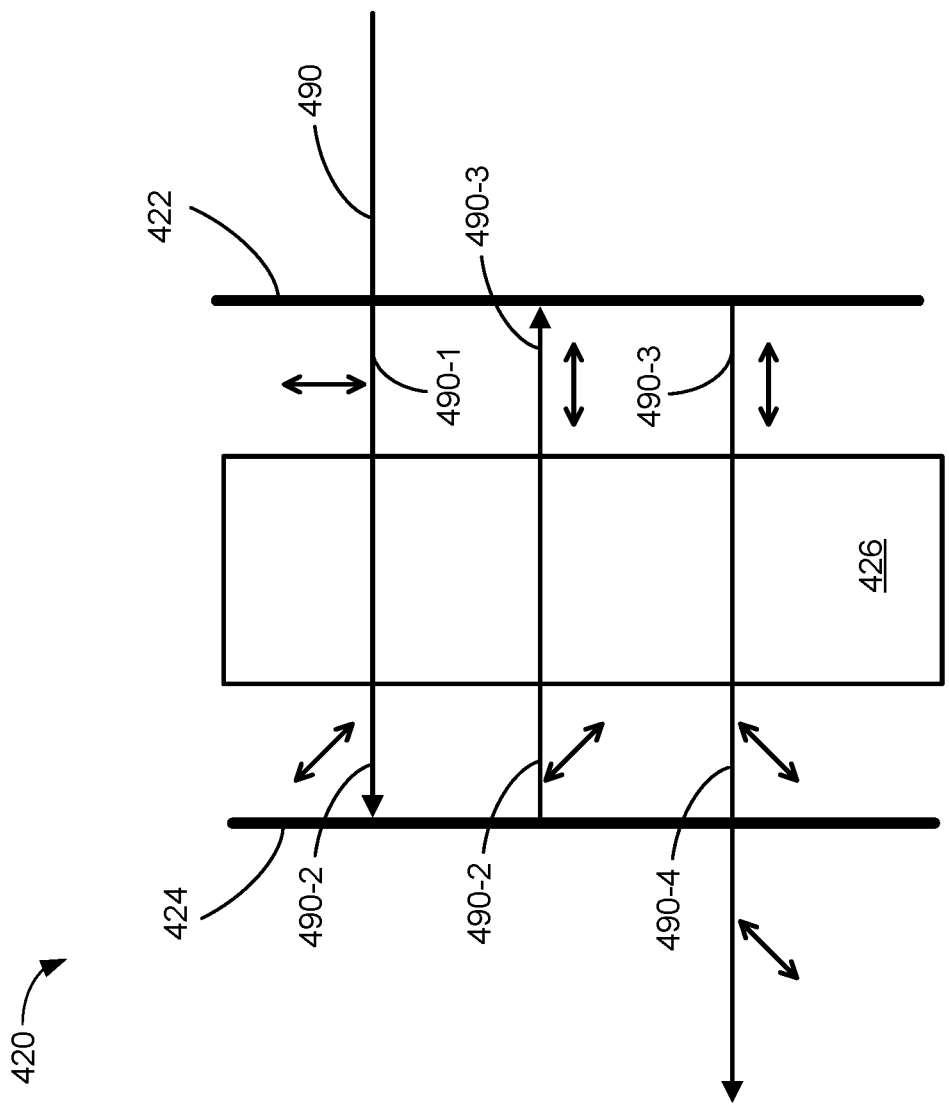

900

930 The first image light has wavelengths within a first wavelength range. Concurrent to transmitting the first image light through the first optical assembly:

(i) Output second image light from a second image source, distinct from the first image source. The first light having wavelengths within a first wavelength range and the second light having wavelengths within a second wavelength range that is different from the first wavelength range.

(ii) Receive the second image light at a third polarization-sensitive reflector of a second optical assembly. The second optical assembly including a fourth polarization-sensitive reflector and a second Faraday rotator disposed between the third polarization-sensitive reflector and the fourth polarization-sensitive reflector.

(iii) Transmit at least a portion of the second image light through the third polarization-sensitive reflector toward the second Faraday rotator as fifth light having a first polarization.

(iv) Transmit the fifth light through the second Faraday rotator toward the fourth polarization-sensitive reflector as sixth light having the second polarization.

(v) Reflect the sixth light at the fourth polarization-sensitive reflector toward the second Faraday rotator.

(vi) Transmit the sixth light through the second Faraday rotator toward the third polarization-sensitive reflector as seventh light having the third polarization.

(vii) Reflect the sixth light at the third polarization-sensitive reflector toward the second Faraday rotator.

(viii) Transmit the sixth light through the second Faraday rotator toward the fourth polarization-sensitive reflector as eighth light having the fourth polarization.

(ix) Transmit the eighth light through the fourth polarization-sensitive reflector.

Figure 9B

OPTICAL DEVICE INCLUDING FARADAY ROTATOR

RELATED APPLICATIONS

This application claims the benefit of, and priority to, U.S. Provisional Patent Application Ser. No. 62/923,416, filed Oct. 18, 2019, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Many head-mounted display devices use optical assemblies that are bulky and/or heavy in order to direct the display light toward a user's eyes. However, compact and lightweight head-mounted display devices are desirable in order to provide users with a comfortable experience. Additionally, it may be desirable for optics in a head-mounted display to be efficient in directing the light and have low loss in order to provide energy-efficient head mounted displays and improve battery life in head mounted displays.

Therefore, there is a need for efficient, compact, and light-weight optics applicable for use in head-mounted display devices.

SUMMARY

Accordingly, there is a need for a light weight and compact head-mounted display device that can efficiently project image light to a user's eyes. Optical systems in head-mounted displays are often bulky, heavy, and do a poor job of efficiently transmitting light from a display to a user's eyes. Such optical systems result in heavy or bulky head-mounted displays, which may be lead to user discomfort with use for prolonged periods of time. Additionally, inefficient transmission of images leads to higher power consumption and shorter battery life. These deficiencies and other problems associated with conventional optical systems used in head-mounted display devices are reduced or eliminated by the disclosed optical devices and display devices.

In accordance with some embodiments, an optical device (e.g., optical assembly) includes a first polarization-sensitive reflector; a second polarization-sensitive reflector, and a Faraday rotator (e.g., magneto-optic element). The first polarization-sensitive reflector is positioned to transmit light having a first polarization and reflect light having a second polarization orthogonal to the first polarization. The second polarization-sensitive reflector is positioned to reflect light having a third polarization and transmit light having a fourth polarization orthogonal to the third polarization. The third polarization is different from the first polarization and the second polarization. The Faraday rotator is disposed between the first polarization-sensitive reflector and the second polarization-sensitive reflector so that the Faraday rotator converts: (i) light having the first polarization into light having the third polarization, (ii) light having the third polarization into light having the second polarization, and (iii) light having the second polarization into light having the fourth polarization.

In accordance with some embodiments, a display device includes one or more image sources (e.g., display, projector) and a first optical assembly. The one or more image sources are configured to provide first image light. The first optical assembly includes a first polarization-sensitive reflector, a second polarization-sensitive reflector, and a Faraday rotator. The Faraday rotator is disposed between the first polarization-sensitive reflector and the second polarization-sensitive reflector such that: (i) at least a portion of the first image light having a first polarization is transmitted through the first polarization-sensitive reflector as first light, and the first light is transmitted through the first Faraday rotator toward the second polarization-sensitive reflector as second light having a second polarization different from the first polarization, (ii) the second light is reflected by the second polarization-sensitive reflector toward the first Faraday rotator and transmitted through the first Faraday rotator toward the first polarization-sensitive reflector as third light having a third polarization orthogonal to the first polarization, (iii) the third light is reflected by the first polarization-sensitive reflector toward the first Faraday rotator and transmitted through the first Faraday rotator toward the second polarization-sensitive reflector as fourth light having a fourth polarization orthogonal to the second polarization, and (iv) the fourth light is transmitted through the second polarization-sensitive reflector.

In accordance with some embodiments, a method is performed at an optical assembly including a first polarization-sensitive reflector, second polarization-sensitive reflector, and a Faraday rotator disposed between the first polarization-sensitive reflector and the second polarization-sensitive reflector. The method includes receiving first image light at the first polarization-sensitive reflector, transmitting at least a portion of the first image light through the first polarization-sensitive reflector toward the Faraday rotator as first light having a first polarization, and transmitting the first light through the Faraday rotator toward the second polarization-sensitive reflector as second light having a second polarization different from the first polarization. The method also includes reflecting the second light at the second polarization-sensitive reflector toward the Faraday rotator, and transmitting the second light through the first Faraday rotator toward the first polarization-sensitive reflector as third light having a third polarization orthogonal to the first polarization. The method further includes reflecting the third light at the first polarization-sensitive reflector toward the Faraday rotator, transmitting the third light through the first Faraday rotator toward the second polarization-sensitive reflector as fourth light having a fourth polarization orthogonal to the second polarization, and transmitting the fourth light through the second polarization-sensitive reflector.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is an isometric view of a display device in accordance with some embodiments.

FIG. 4A is a schematic diagram of an optical assembly in accordance with some embodiments.

FIGS. 9A-9C is a flow chart of a method performed by a display device in accordance with some embodiments.

Figure 1:
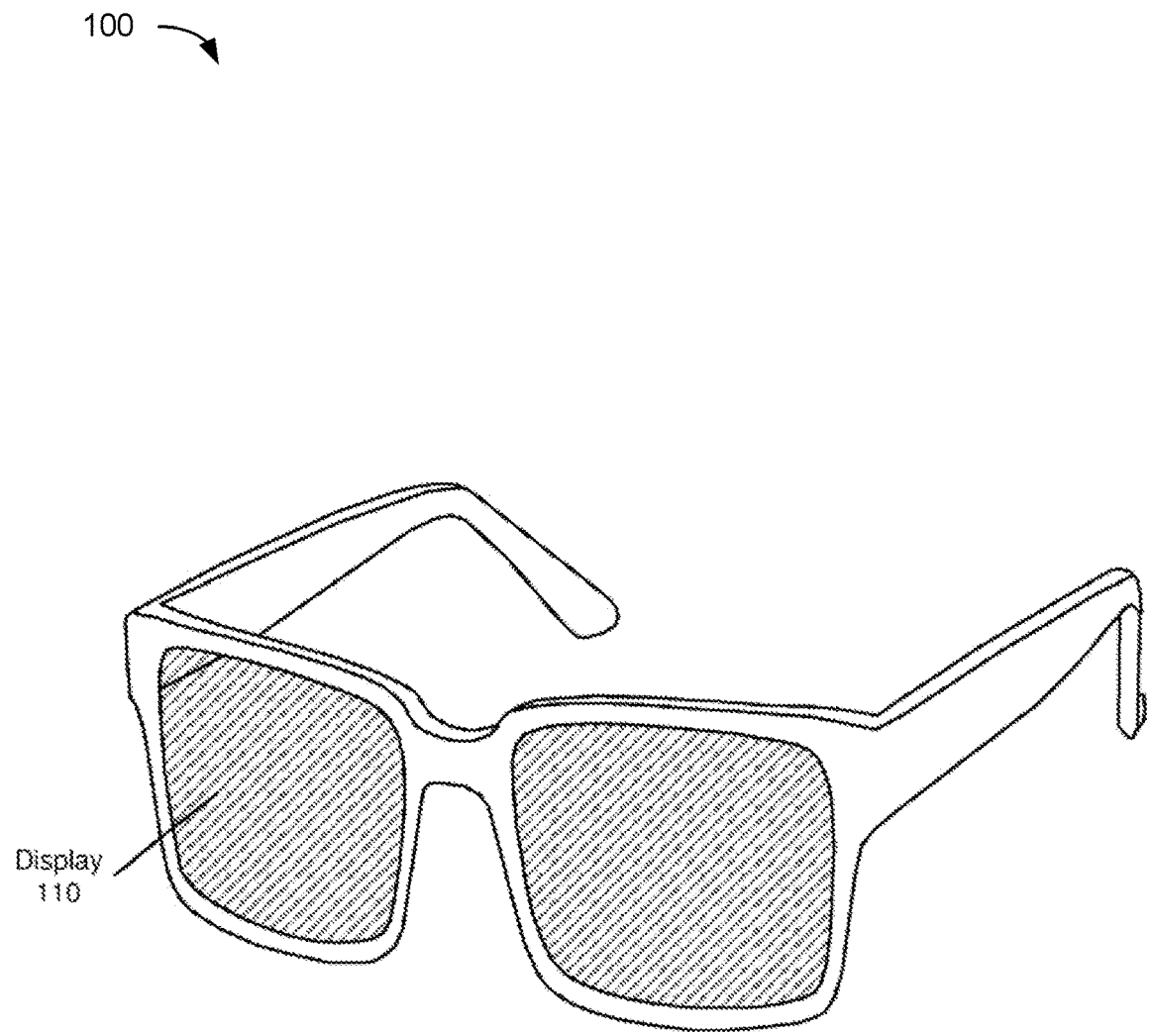
FIG. 1 is a perspective view of a display device in accordance with some embodiments.

These figures are not drawn to scale unless indicated otherwise.

DETAILED DESCRIPTION

The present disclosure provides optical assemblies with folded optical paths (e.g., pancake assemblies) to increase the length of an optical path of light projected from a display toward an eye of a user. The optical assemblies include a Faraday rotator disposed between two reflectors. The reflectors are configured to reflect or transmit light based on the polarization of the light and the Faraday rotator is configured to change a polarization of light transmitted through the Faraday rotator. Such folded optics increases the field of view without increasing the physical distance between the display and the eye of the user. The optical assemblies described herein have dimensions that are similar or smaller than those of traditional optical assemblies with corresponding optical properties, and are more efficient than traditional optical assemblies.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first retarder could be termed a second retarder, and, similarly, a second retarder could be termed a first retarder, without departing from the scope of the various described embodiments. The first retarder and the second retarder are both retarders, but they are not the same retarder.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
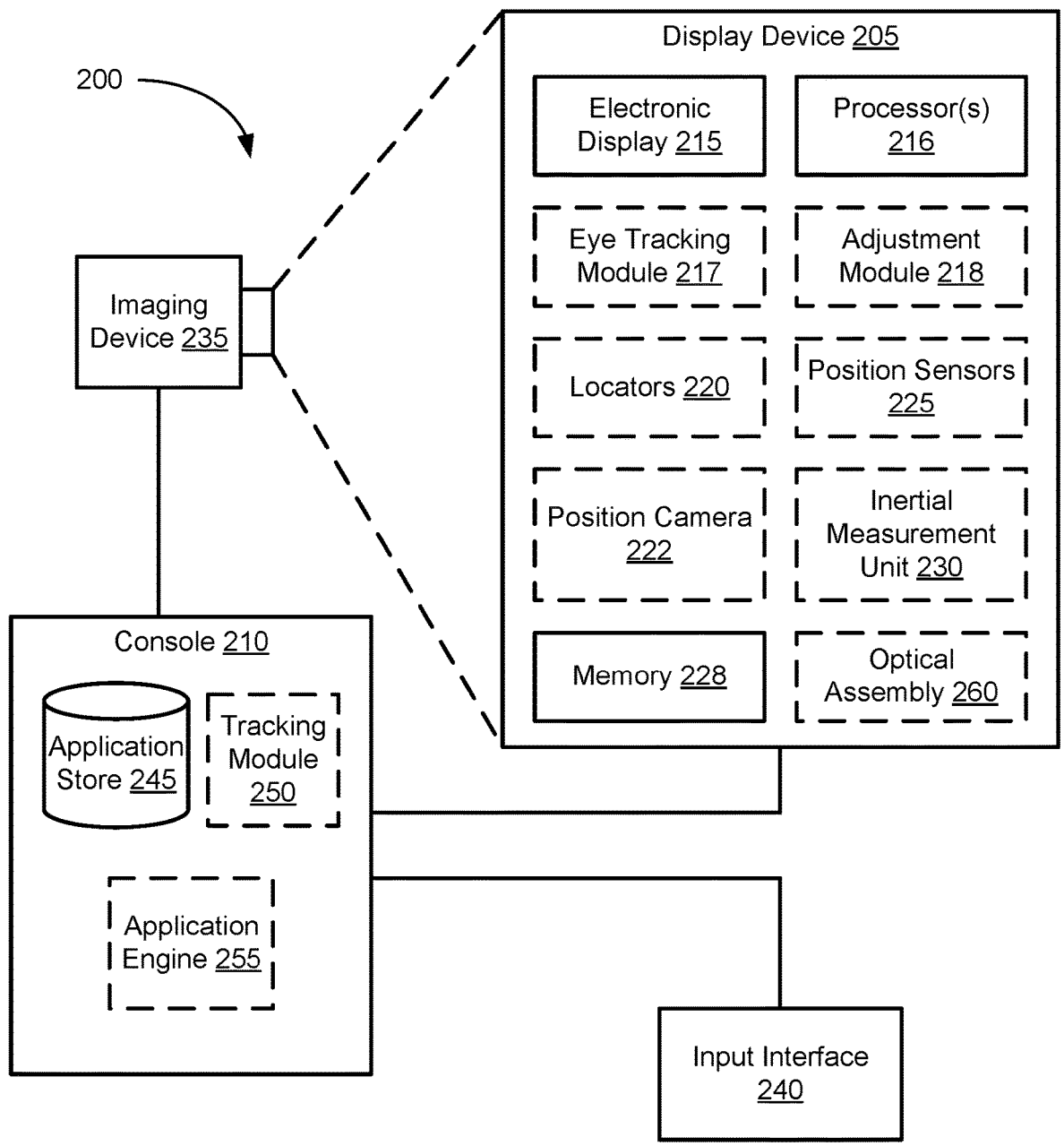
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device 310. In some embodiments, the IR detector array is integrated into light emission device 310.

In some embodiments, light emission device 310 including an emission intensity array make up a display element. Alternatively, the display element includes light emission device 310 (e.g., when light emission device 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

Figure 3B:
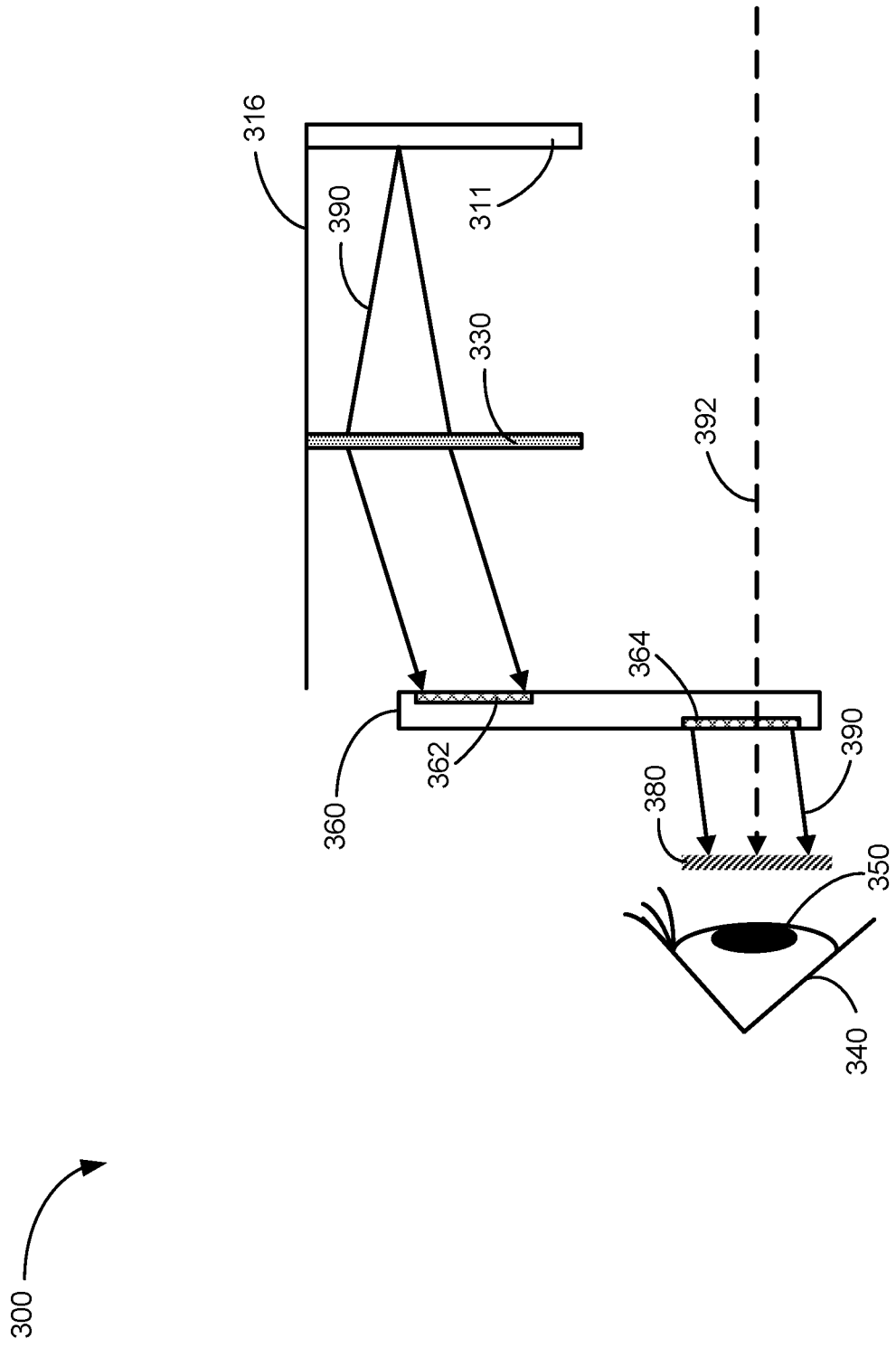
FIG. 3B is a schematic diagram of a display device in accordance with some embodiments.

FIG. 3B is a schematic diagram of a display device 300 in accordance with some embodiments. Display device 300 in FIG. 3B includes display 311 (which may correspond to light emission device 310 shown in FIG. 3A), optical assembly 330, and a waveguide 360 (e.g., optical waveguide). In some embodiments, display device 300 may also include a frame 316. In some embodiments, frame 316 and display 311 form a housing and define an interior space for display device 300. Optical assembly 330 is disposed inside the housing (e.g., in the interior space) between display 311 and a user's eyes 340 (when the device is in use).

In some embodiments, display device 300 is a head-mounted display device. Typically, frame 316 and optical assembly 330 are sized and shaped in a way such that frame 316 and optical assembly 330 avoid interference with a user's brow bone.

In some embodiments, display 311 is configured to output image light 390. Optical assembly 330 is configured to receive image light 390 output from display 311 and to transmit image light 390 at a first optical power toward waveguide 360. The waveguide 360 may include an input coupler 362 configured to couple the image light 390 into the waveguide 360. The waveguide 360 may also include an output coupler 364 configured to couple the image light 390 out of the waveguide 360 and direct the image light 390 toward an eyebox 380. Eyebox 380 typically represents an area where the pupil 350 of an eye 340 of a user may be located while maintaining a full field of view. In some embodiments, at least a portion of the waveguide 360 (e.g., a portion of the waveguide 360 adjacent to the output coupler 364) is configured to transmit at least a portion of ambient light 392 so that the ambient light 392 is transmitted toward the eyebox 380. In some cases, the image light 390 and at least a portion of the ambient light 392 are transmitted toward a user's eye 340 (e.g., concurrently or alternatingly) to provide one or more augmented reality (AR) scenes.

FIG. 4A is a schematic diagram of an optical assembly 420 in accordance with some embodiments. The optical assembly 420 includes a first reflector 422, a second reflector 424, and a Faraday rotator 426 that is disposed between the first reflector 422 and the second reflector 424. The first reflector 422 (e.g., a reflective polarizer or a polarization-sensitive polarizer) is positioned to transmit light having a first polarization and reflect light having a second polarization that is orthogonal to the first polarization. For example, the first reflector 422 may be a first wire grid polarizer oriented to transmit light having the first polarization and reflect light having the second polarization. The second reflector 424 (e.g., a reflective polarizer or a polarization-sensitive polarizer) is positioned to transmit light having a third polarization and reflect light having a fourth polarization that is orthogonal to the third polarization. The third polarization is different from each of the first polarization and the second polarization. For example, the second reflector 424 may be a second wire grid polarizer oriented to transmit light having the third polarization and reflect light having the fourth polarization.

The Faraday rotator 426 is configured to transmit light while changing a polarization of the light. For example, the Faraday rotator 426 is configured to: (i) convert light having the first polarization into light having the third polarization (e.g., by rotating the polarization of the light by 45 degrees), (ii) convert light having the third polarization into light having the second polarization (e.g., by rotating the polarization of the light by 45 degrees), and (iii) convert light having the second polarization into light having the fourth polarization (e.g., by rotating the polarization of the light by 45 degrees).

The optical assembly 420 is configured to receive image light 490 (e.g., corresponding to image light 390 output from a display 311) at the first reflector 422. The first reflector 422 is positioned (e.g., oriented) so that at least a portion of the image light 490 having a first polarization is transmitted through the first reflector 422 toward the first Faraday rotator 426 as first light 490-1. The first Faraday rotator is configured to transmit the first light 490-1 toward the second reflector 424 as second light 490-2 while changing the polarization of the first light 490-1 such that the second light 490-2 has the third polarization (e.g., the first light 490-1 is s-polarized and the second light 490-2 is linearly polarized along a plane forming 45 degrees from the plane of s-polarization). The second reflector 424 is positioned (e.g., oriented) so that the second light 490-2 is reflected at the second reflector 424 toward the first Faraday rotator 426 and the first Faraday rotator 426 is configured to transmit the second light 490-2 toward the first reflector 422 as third light 490-3 while changing the polarization of the second light 490-2 such that the third light 490-3 has the second polarization (e.g., the third light 490-3 is linearly polarized along a plane forming 90 degrees from the plane of s-polarization, namely p-polarized). The first reflector 422 is positioned (e.g., oriented) so that the third light 490-3 is reflected at the first reflector 422 toward the first Faraday rotator 426 and the first Faraday rotator 426 is configured to transmit the third light 490-3 toward the second reflector 424 as fourth light 490-4 while changing the polarization of the third light 490-3 such that the fourth light 490-4 has the fourth polarization (e.g., the fourth light 490-4 is linearly polarized along a plane forming 135 degrees from the plane of s-polarization). The second reflector 424 is positioned (e.g., oriented) so that the fourth light 490-4 is transmitted through the second reflector 424.

In some embodiments, the third polarization differs from the first polarization by a phase that is $$(2n-1)\frac{\pi}{4},$$

where n is an integer. For example, when the first polarization is a linear polarization at 0°, the third polarization may be a linear polarization at 45° or a linear polarization at 135°. Since the second polarization is orthogonal to the first polarization and the fourth polarization is orthogonal to the third polarization, the fourth polarization also differs from the second polarization by a phase that is $$(2n-1)\frac{\pi}{4},$$

where n is an integer. For example, when the first polarization is a linear polarization at 0°, the second polarization is a linear polarization at 90°, the third polarization is a linear polarization at 45°, and the fourth polarization is a linear polarization at 135°.

Figure 4C:
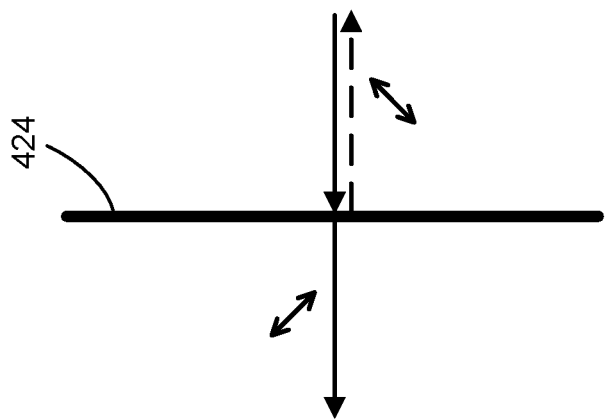
FIGS. 4B-4C illustrate polarization selectivity of a reflector in accordance with some embodiments.
Figure 4B:
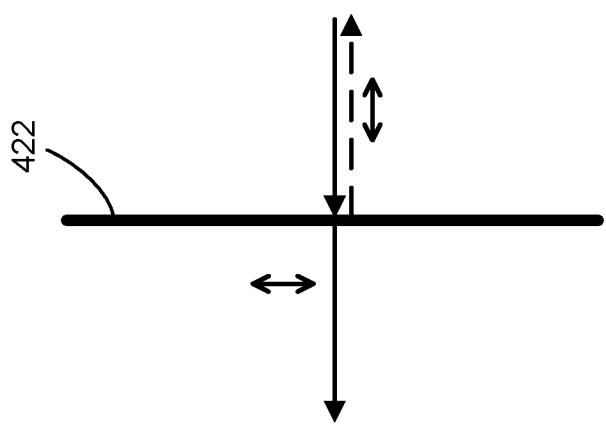

FIGS. 4B-4C illustrate polarization selectivity of the first reflector 422 and the second reflector 424, respectively, in accordance with some embodiments.

In some embodiments, one or more of the first reflector 422 and the second reflector 424 is a reflective polarizer (e.g., a polarization-sensitive reflector) configured to transmit or reflect light having a particular linear polarization. For example, the first reflector 422 may be configured (e.g., oriented) to transmit s-polarized light and reflect p-polarized light, and the second reflector 424 may be configured to transmit light having a linear polarization at 45° and reflect light having a linear polarization at 135° (or vice versa). For example, the first reflector 422 is a wire-grid polarizer oriented along the s-plane for transmitting the s-polarized light and reflecting the p-polarized light, and the second reflector 424 is a wire-grid polarizer oriented along the 45° for transmitting the light having the linear polarization at 45° and reflecting the light having the linear polarization at 135°.

In some embodiments, one or more of the first reflector 422 and the second reflector 424 include a layer of cholesteric liquid crystals (CLC) that is configured to transmit or reflect light having a particular circular polarization. For example, the first reflector 422 may be configured to transmit right-circular polarized (RCP) light and reflect left-circular polarized (LCP) light, and the second reflector 424 may be configured to transmit light having a first elliptical polarization and reflect light having a second elliptical polarization that is orthogonal to the first elliptical polarization.

In some embodiments, one or more of the first reflector 422 and the second reflector 424 is a polarization sensitive hologram (PSH) that is configured to transmit or reflect light having a particular polarization. The particular polarization may be any of a linear polarization (such as s-polarized light, p-polarized light, linear polarization at 45°, or linear polarization at 135), a circular polarization (such as RCP or LCP), or an elliptical polarization.

Figure 4E:
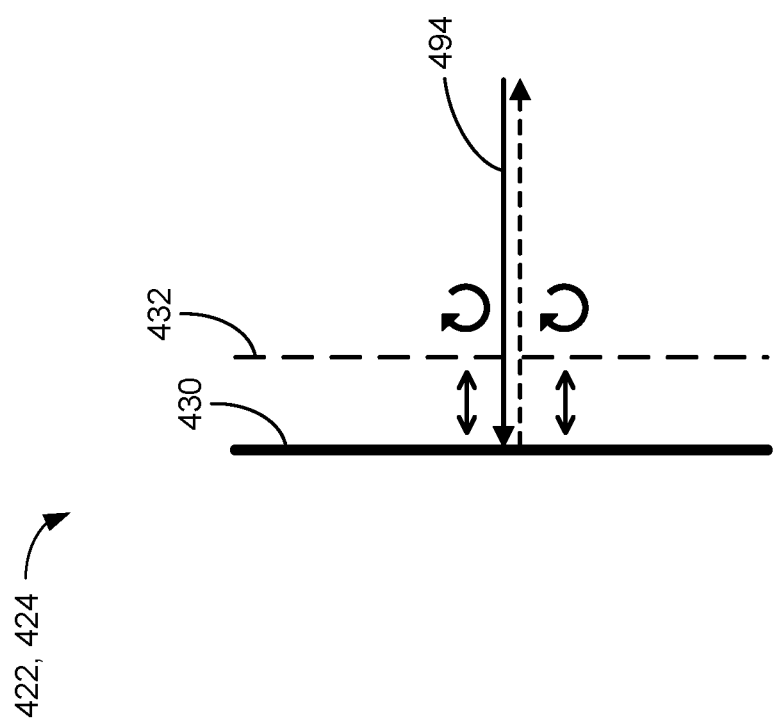
FIGS. 4D-4E illustrate polarization selectivity of a reflector in accordance with some embodiments.
Figure 4D:
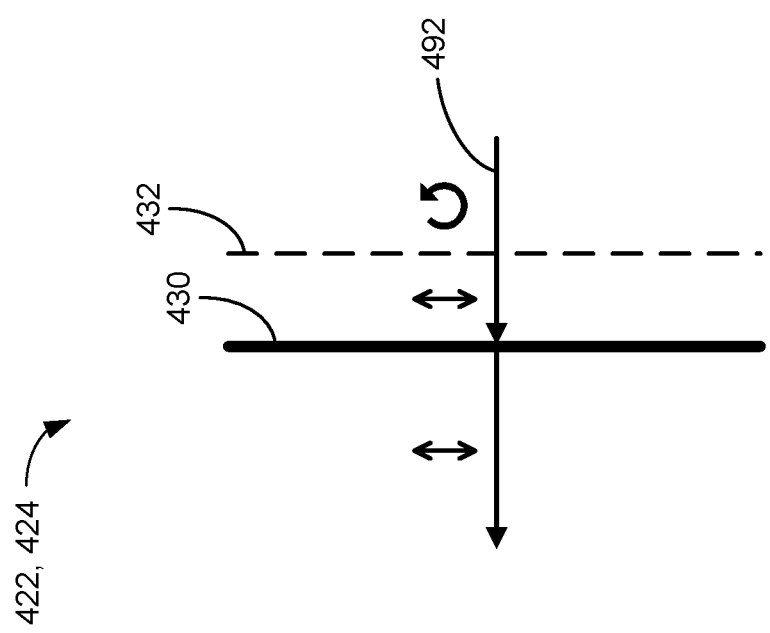

FIGS. 4D-4E illustrate polarization selectivity of a reflector in accordance with some embodiments. In some embodiments, as shown, the reflector may include a reflective polarizer 430 (which corresponds to, e.g., first reflector 422 or second reflector 424) coupled with an optical retarder 432 (e.g., quarter-wave plate). As shown in FIG. 4D, the optical retarder 432 is positioned (e.g., oriented) to, upon receiving light 492 having a first circular polarization (e.g., RCP), convert the light 492 from the first circular polarization to a first linear polarization (e.g., s-polarization). The reflective polarizer 430 is positioned (e.g., oriented) so that the light 492 having the first linear polarization is transmitted through the reflective polarizer 430. As shown in FIG. 4E, the optical retarder 432 is positioned (e.g., oriented) to, upon receiving light 494 having a second circular polarization (e.g., LCP), convert the light 494 from the second circular polarization to a second linear polarization (e.g., p-polarization). The reflective polarizer 430 is positioned (e.g., oriented) so that the light 494 having the second linear polarization is reflected at the reflective polarizer 430 toward the optical retarder 432. The optical retarder 432 is positioned (e.g., oriented) to, upon receiving the light 494 having the second linear polarization, convert the light 494 from the second linear polarization to the second circular polarization.

Figure 5:
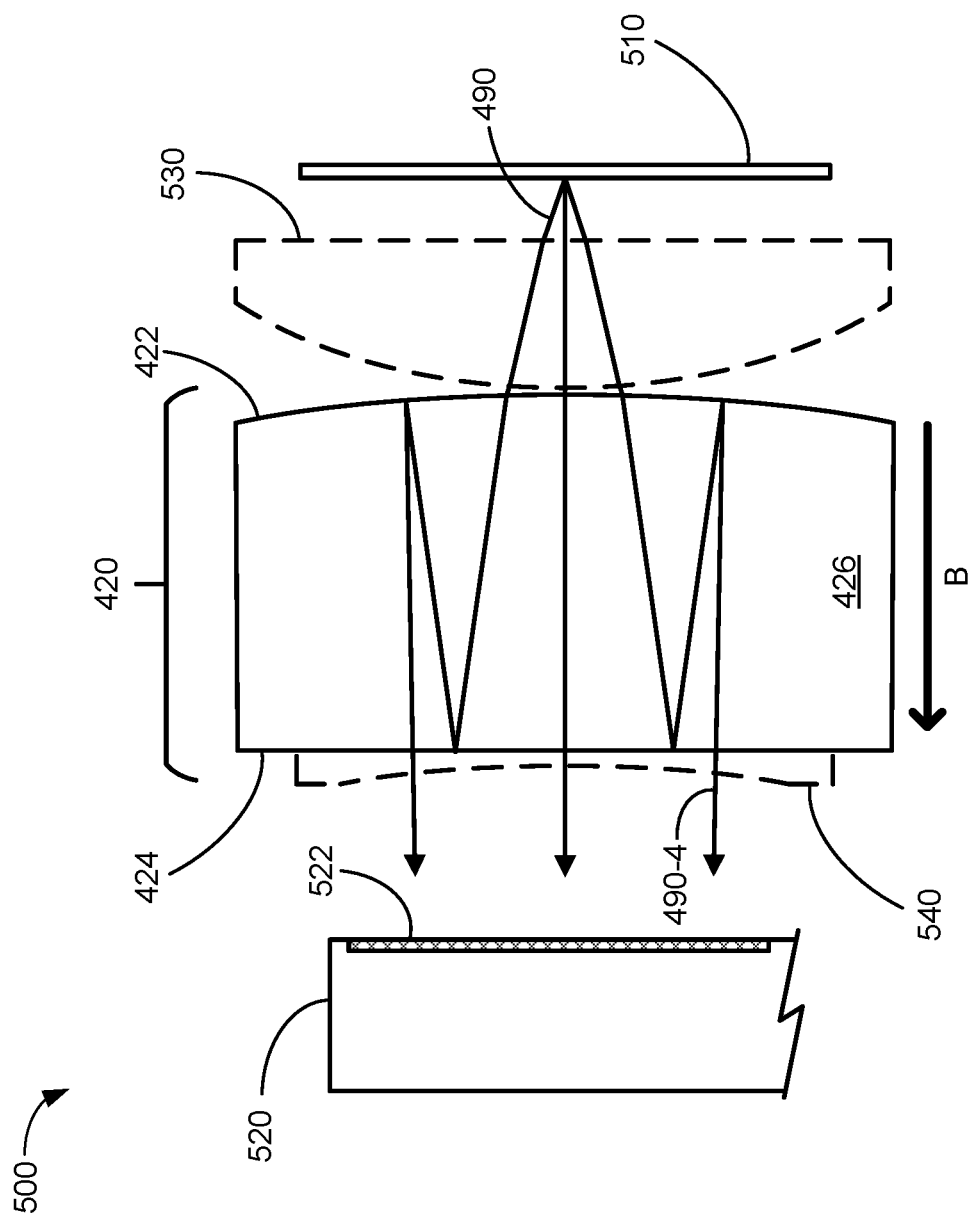
FIG. 5 is a schematic diagram of a display device in accordance with some embodiments.

FIG. 5 is a schematic diagram of a display device 500 in accordance with some embodiments. The display device 500 includes a light source 510 (e.g., image source, display, or projector), the optical assembly 420 (which corresponds to the optical assembly 420 shown in FIG. 4A), and a waveguide 520 (which corresponds to the waveguide 360 shown in FIG. 3B). The light source 510 (which may correspond to display 311 shown in FIG. 3B) is configured to provide (e.g., generate, emit, or output) the image light 490 toward the optical assembly 420. The waveguide 520 includes an input coupler 522 that is configured to receive the fourth light 490-4 output from the optical assembly 420 and couple at least a portion of the fourth light 490-4 into the waveguide 520.

In some embodiments, the display device 500 may also include one or more optical elements 530 that are disposed between the light source 510 and the optical assembly 420. When included in display device 500, the one or more optical elements 530 are configured to provide (e.g., transmit, direct) the image light 490 toward the optical assembly 420 at an optical power (e.g., a non-zero optical power). In some embodiments, the one or more optical elements 530 include a focusing or defocusing optical element (such as a positive or negative lens) that contributes to focusing or defocusing of the image light 490.

In some embodiments, the display device 500 includes an optical component 540. In some embodiments, the optical component 540 is configured to focus or de-focus light (e.g., the optical component is a positive or negative lens). In some embodiments, the optical component 540 is configured to correct or reduce optical aberrations.

In some embodiments, at least a portion of the waveguide 520 is configured to transmit at least a portion of ambient light such that the image light 390 and at least a portion of the ambient light are transmitted toward an eye of a user, thereby providing one or more augmented reality (AR) scenes.

Figure 6A:
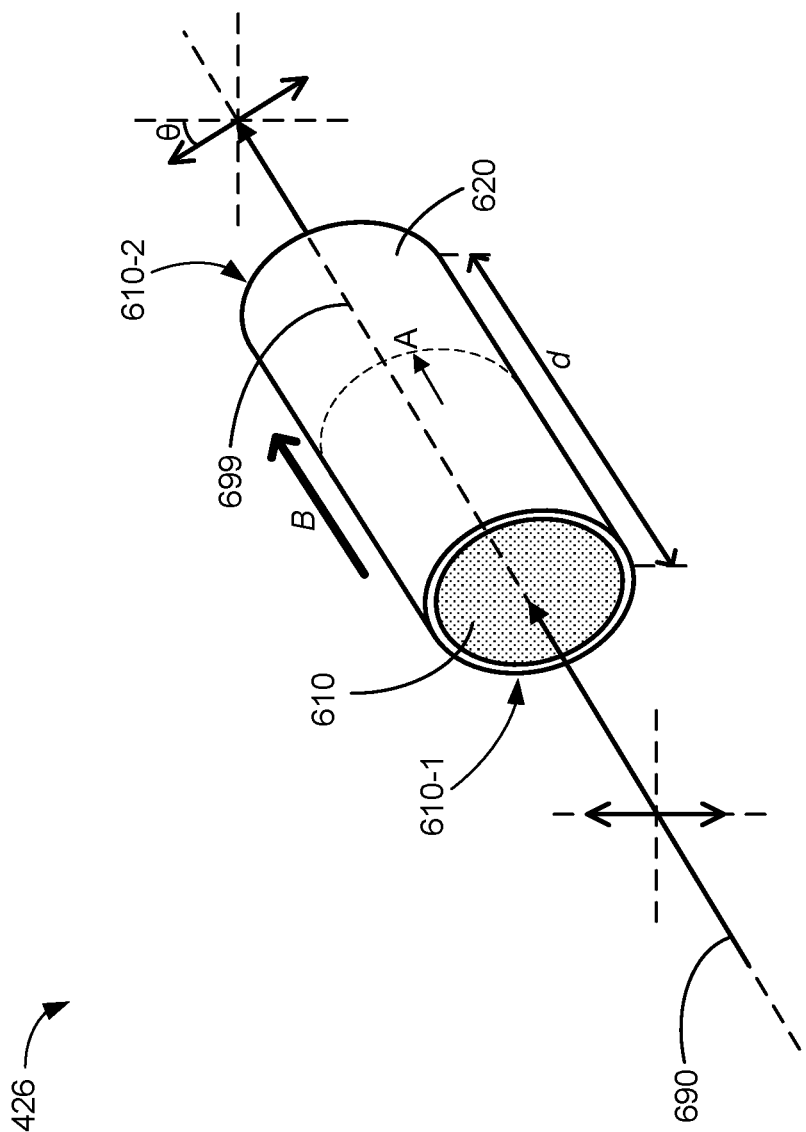
FIGS. 6A-6B are schematic diagrams of a Faraday rotator in accordance with some embodiments.
Figure 6B:
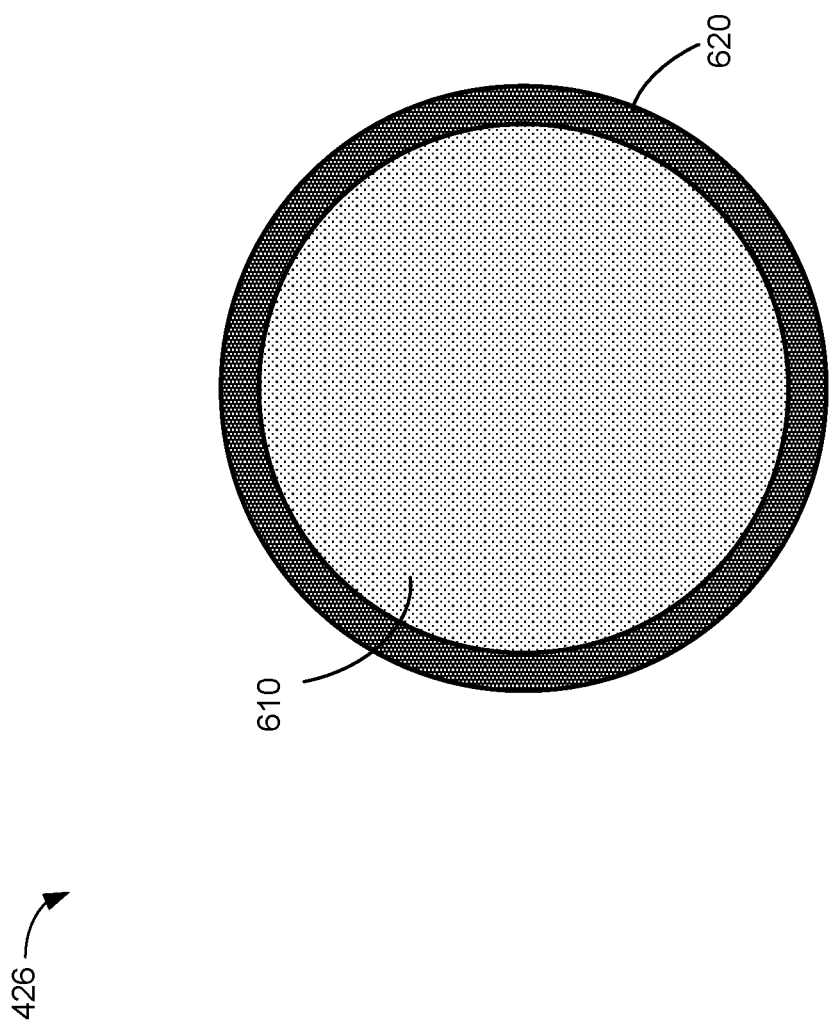

FIGS. 6A-6B are schematic diagrams of a Faraday rotator 426 in accordance with some embodiments. The Faraday rotator 426 includes an optically transparent material 610 (e.g., a ferromagnetic crystal) that has a first surface 610-1 and a second surface 610-2 that is opposite to the first surface 610-1. The optically transparent material 610 has a thickness d that corresponds to a distance between the first surface 610-1 and the second surface 610-2. The Faraday rotator 426 also includes a magnet 620 that is disposed adjacent to the optically transparent material 610 such that the magnet 620 provides a magnetic field between the first surface 610-1 and the second surface 610-2 (e.g., the magnetic field has a non-zero component along an optical axis 699 that intersects the first surface 610-1 and the second surface 610-2). The optically transparent material 610 has a non-zero Verdet constant such that when a magnetic field is applied to the optically transparent material 610, light 690 transmitted through the optically transparent material 610 experiences a phase shift due to the Faraday effect. The phase shift experienced by the transmitted light 690 is proportional to a magnetic flux density (B) (e.g., a magnetic field strength) of the magnetic field in the direction of light propagation (e.g., along the optical axis 699), the Verdet constant (V) of the optically transparent material 610, and the thickness (d) of the optically transparent material 610.

FIG. 6A shows that light 690 is transmitted through the Faraday rotator 426 and its polarization is rotated from a first linear polarization (e.g., s-polarization) to a linear polarization at an angle θ. The angle θ is based on the magnetic flux density (B) of the magnetic field in the direction of light propagation (between the first surface 610-1 and the second surface 610-2), the Verdet constant (V) of the optically transparent material 610, and the thickness (d) of the optically transparent material 610 (e.g., the angle θ is proportional to B, V, and d, such as θ=BVd). Thus, the angle θ is a predefined angle when the Verdet constant (V), the thickness (d) of the optically transparent material 610, and the magnetic flux density (B) are fixed or predetermined. In some cases, the angle θ is adjusted by adjusting the magnetic flux density (B) for an optically transparent material having a particular thickness d and the Verdet constant V.

In some cases, it is desirable for the optically transparent material 610 to have a high Verdet constant (e.g., a Verdet constant of 2,000 Tesla/millimeter (T/mm) or higher) so that the optically transparent material 610 can have a small thickness (d), resulting in a compact Faraday rotator 426 (and thereby a compact optical assembly 420). In some embodiments, the optically transparent material 610 has a Verdet constant that is greater than 2,000 T/mm, 20,000 T/mm, or 200,000 T/mm). For example, the optically transparent material 610 may be a terbium gallium garnet (TGG) or a bismuth iron garnet ($Bi_3Fe_5O_{12}$, also called BIG). In some embodiments, the thickness (d) is less than or equal to any of: 20 millimeters, 15 millimeters, 12 millimeters, 11 millimeters, 10 millimeters, 8 millimeters, 9 millimeters, 7 millimeters, 6 millimeters, or 5 millimeters.

In some embodiments, the magnet 620 is disposed on a third surface of the optically transparent material 610 that is distinct from each of the first surface 610-1 and the second surface 610-2. For example, when the optically transparent material 610 has a shape of a cylinder, the magnet 620 is disposed on a side surface of the cylinder. Thus, the magnet 620 may surround at least a portion of the optically transparent material 610, as shown in FIGS. 6A and 6B. FIG. 6A also shows line A from which the cross-sectional view in FIG. 6B is taken. In FIG. 6B, the optically transparent material 610 is fully surrounded by the magnet 620 (e.g., the magnet 620 is hollow cylinder and the optically transparent material 610 is disposed inside the cylinder). In some embodiments, the optically transparent material 610 is partially surrounded by the magnet 620.

Figure 6C:
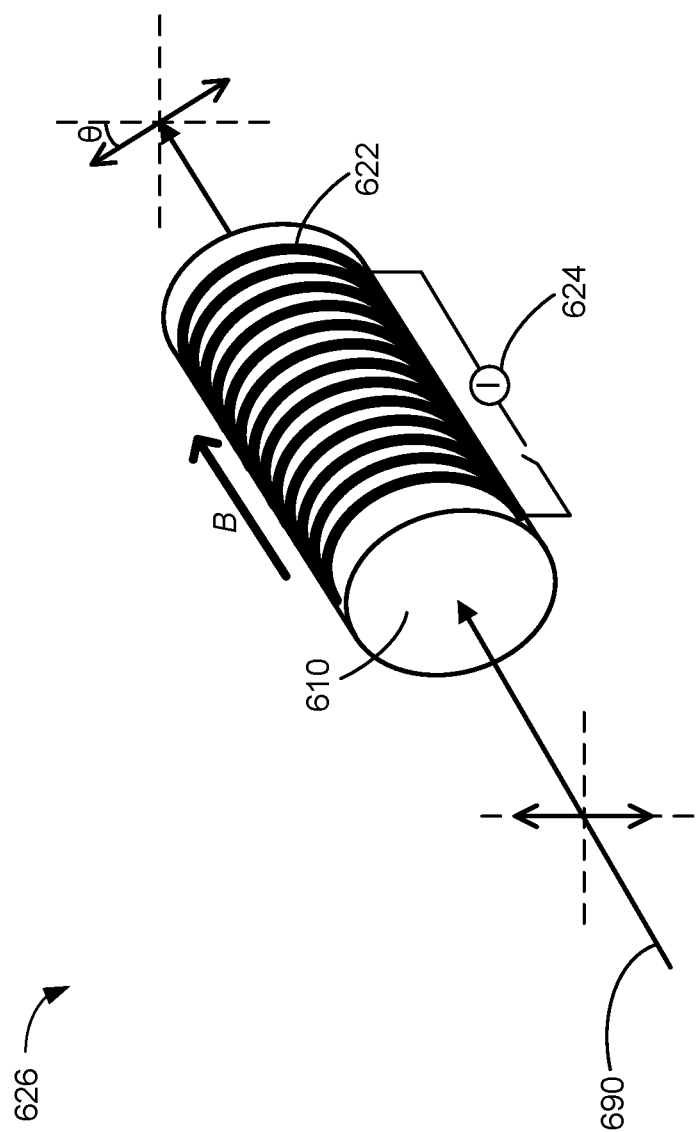
FIG. 6C is a schematic diagram of an electromagnetic Faraday rotator in accordance with some embodiments.

FIG. 6C is a schematic diagram of an electromagnetic Faraday rotator 626 in accordance with some embodiments. The electromagnetic Faraday rotator 626 shown in FIG. 6C is similar to the Faraday rotator 426 shown in FIG. 6A except that the magnet 620 (e.g., a permanent magnet) is replaced by an electromagnet. The electromagnet is configured to provide a magnetic field when an electric current is applied. In some embodiments, the electromagnet includes a wire 622 (or a coil) that spirals around the optically transparent material 610. The coiled wire 622 is connected to a current source 624 (or a voltage source) and is configured to provide a magnetic field across the optically transparent material 610 when an electrical current passes through the wire. The magnetic flux density (B) of the magnetic field provided by the electromagnet depends on the current passing through the wire 622. For example, when no current is passing through the wire 622, the magnetic flux density is zero (e.g., B=0). In another example, the magnetic flux density (B) increases when a current passing through the wire 622 increases. Thus, by controlling the currently passing through the wire 622, the Faraday rotator 426 may rotate the polarization of the transmitted light by a different angle. In some cases, by controlling the current passing through the wire 622, the Faraday rotator 426 may rotate the polarization of the transmitted light (when the current passes through the wire 622) or may forgo rotating the polarization of the transmitted light (when no current passes through the wire 622).

Figure 7A:
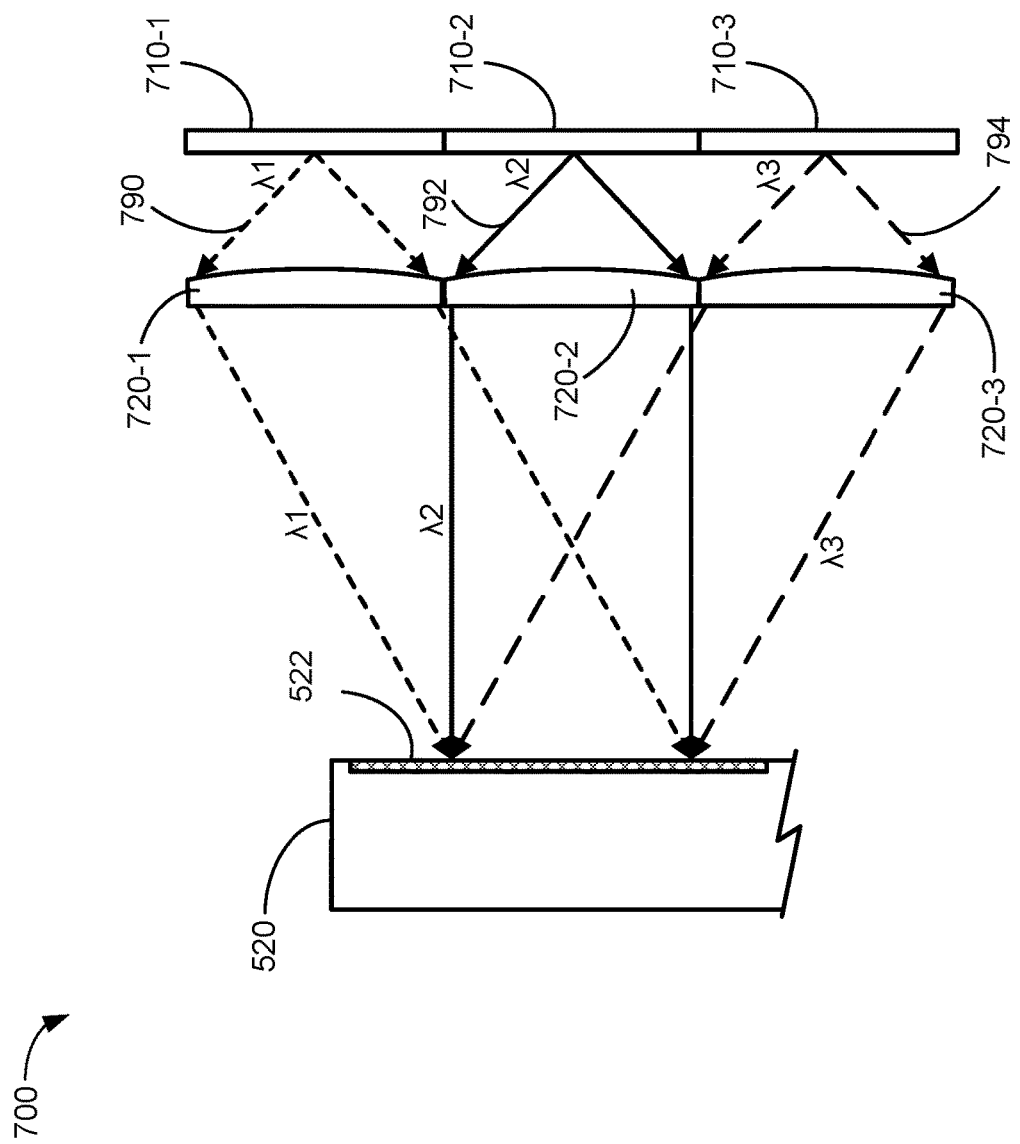
FIG. 7A is a schematic diagram of a display device in accordance with some embodiments.

FIG. 7A is a schematic diagram of a display device 700 in accordance with some embodiments. Display device 700 includes a plurality of light sources 710 (e.g., light sources 710-1, 710-2, and 710-3), a plurality of optical assemblies 720 (e.g., optical assemblies 720-1, 720-2, and 720-3), and a waveguide 520. The plurality of light sources 710 includes a first light source 710-1, a second light source 710-2, and a third light source 710-3. A respective light source of the plurality of light sources 710 (e.g., displays, projectors, image sources) corresponds to light source 510, described above with respect to FIG. 5. The plurality of optical assemblies 720 includes a first optical assembly 720-1, a second optical assembly 720-2, and a third optical assembly 720-3. A respective optical assembly of the plurality of optical assemblies 720 corresponds to optical assembly 420, described above with respect to FIG. 4A. Although FIG. 7A illustrates three light sources and three optical elements, the plurality of light sources 710 may include any number of light sources (e.g., two or more light sources) and the plurality of optical assemblies 720 may include any number of optical assemblies (e.g., two or more optical assemblies). In some embodiments, as shown, the number of light sources in the plurality of light sources 710 corresponds to the number optical assemblies in the plurality of optical assemblies 720. In some other embodiments, the number of light sources in the plurality of light sources 710 differs from the number optical assemblies in the plurality of optical assemblies 720. For example, the display device 700 may include additional light sources that are not part of the plurality of light sources 710 and/or additional optical components or assemblies that are not part of the plurality of optical assemblies 720 (e.g., display device 700 may also include a light source for eye-tracking and/or optical components or assemblies configured to direct eye-tracking light).

The first light source 710-1 is configured to provide (e.g., emit, output, generate) first image light 790 toward the first optical assembly 720-1, the second light source 710-2 is configured to provide (e.g., emit, output, generate) second image light 792 toward the second optical assembly 720-2, and the third light source 710-3 is configured to provide (e.g., emit, output, generate) third image light 794 toward the third optical assembly 720-3. The first image light 790 has wavelengths within a first wavelength range $\lambda 1$, the second image light 792 has wavelengths within a second wavelength range $\lambda 2$ that is different from the first wavelength range $\lambda 1$, and the third image light 794 has wavelengths within a third wavelength range $\lambda 3$ that is different from each of the second wavelength range $\lambda 2$ and the first wavelength range $\lambda 1$. Each of the first optical assembly 720-1, the second optical assembly 720-2, and third optical assembly 720-3 is configured to output light (shown in FIGS. 7B-7D as light 790-4, 792-4, and 794-4, respectively), toward the waveguide 520. The waveguide 520 includes an input coupler 522 that is configured to receive the light 790-4, 792-4, and 794-4 output by the respective optical assembly and couple at least a portion of the light 790-4, 792-4, and 794-4 output from the respective optical assembly into the waveguide 520 (e.g., the input coupler 522 may include an optical steering element, such as one or more gratings, one or more prisms, or one or more lenses, to steer impinging light into a direction so that the steered light propagates within the waveguide 520 via total internal reflection).

In some embodiments, each of the first wavelength range λ1, the second wavelength range λ2, and the third wavelength range λ3 includes non-overlapping wavelengths (e.g., each wavelength range does not overlap with any of the other two wavelength ranges). For example, the first image light 790 may correspond to light having a red color corresponding to the first wavelength range λ1 between 635 nm to 700 nm, the second image light 792 may correspond to light having a green color corresponding to the second wavelength range λ2 between 520 nm and 560 nm, and the third image light 794 may correspond to light having a blue color corresponding to the third wavelength range λ3 between 420 nm and 440 nm.

In some embodiments, the first wavelength range λ1, the second wavelength range λ2, and the third wavelength range λ3 may include overlapping wavelengths. In a second example, the first image light 790 may correspond to light having a (primarily or dominantly) blue color corresponding to the first wavelength range λ1 from 450 nm to 500 nm, the second image light 792 may correspond to light having a (primarily or dominantly) green color corresponding to the second wavelength range λ2 from 490 nm to 580 nm, and the third image light 794 may correspond to light having a (primarily or dominantly) red color corresponding to the third wavelength range λ3 between wavelengths from 570 nm to 780 nm.

For example, any of the first image light 790, the second image light 792, and the third image light 794 may correspond to light having any color, such as red, blue, green, white, yellow, orange, etc. Some examples of wavelength ranges include 420-440 nm (blue), 490 nm-570 nm (green), 570-585 nm (yellow), 585-620 (orange), and 620-780 nm (red). Light source 710 may include light emitting elements that are configured to provide light having any wavelength range and are not limited to the examples provided herein.

Figure 7B:
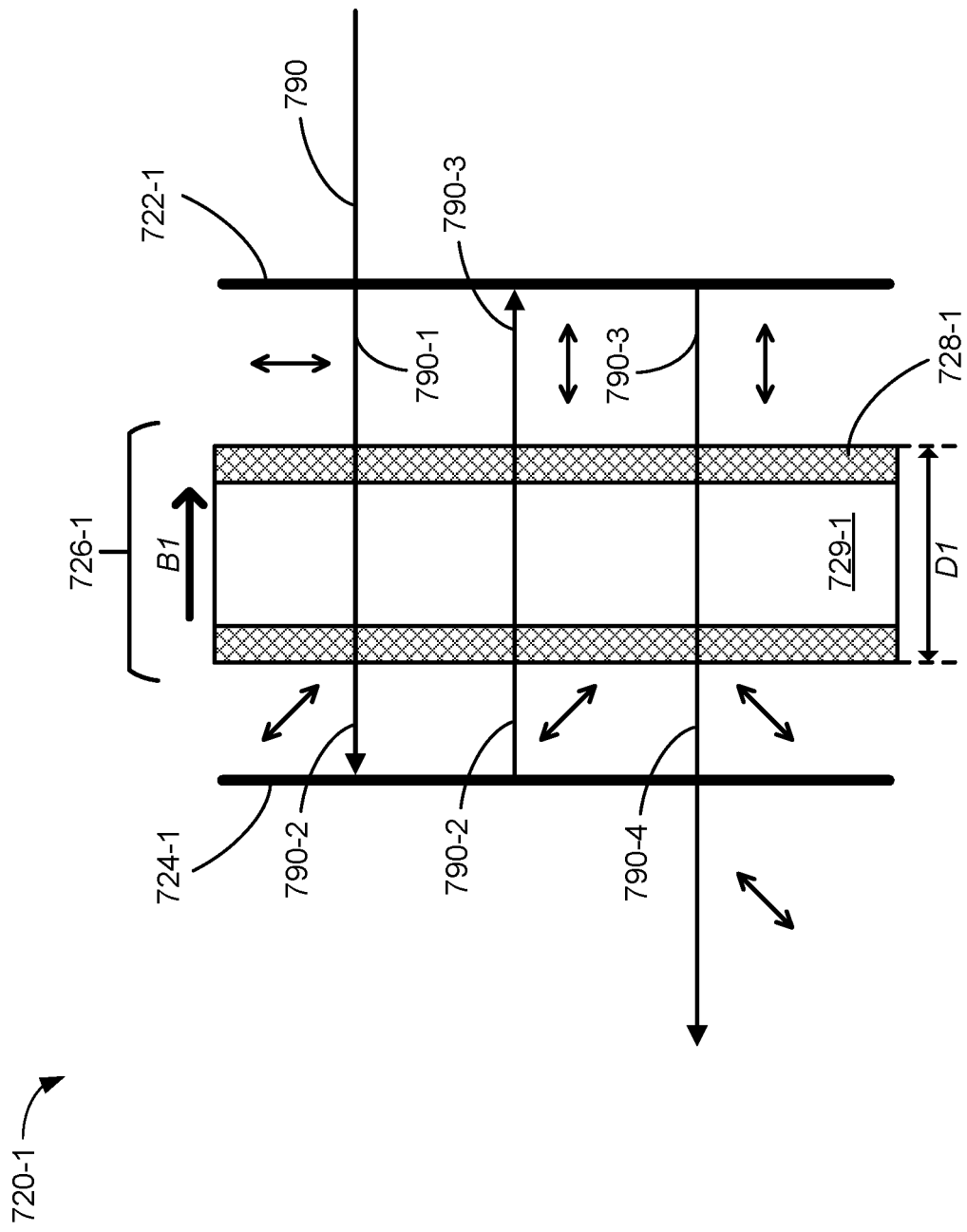
FIGS. 7B-7D are schematic diagrams of optical assemblies in accordance with some embodiments.
Figure 7C:
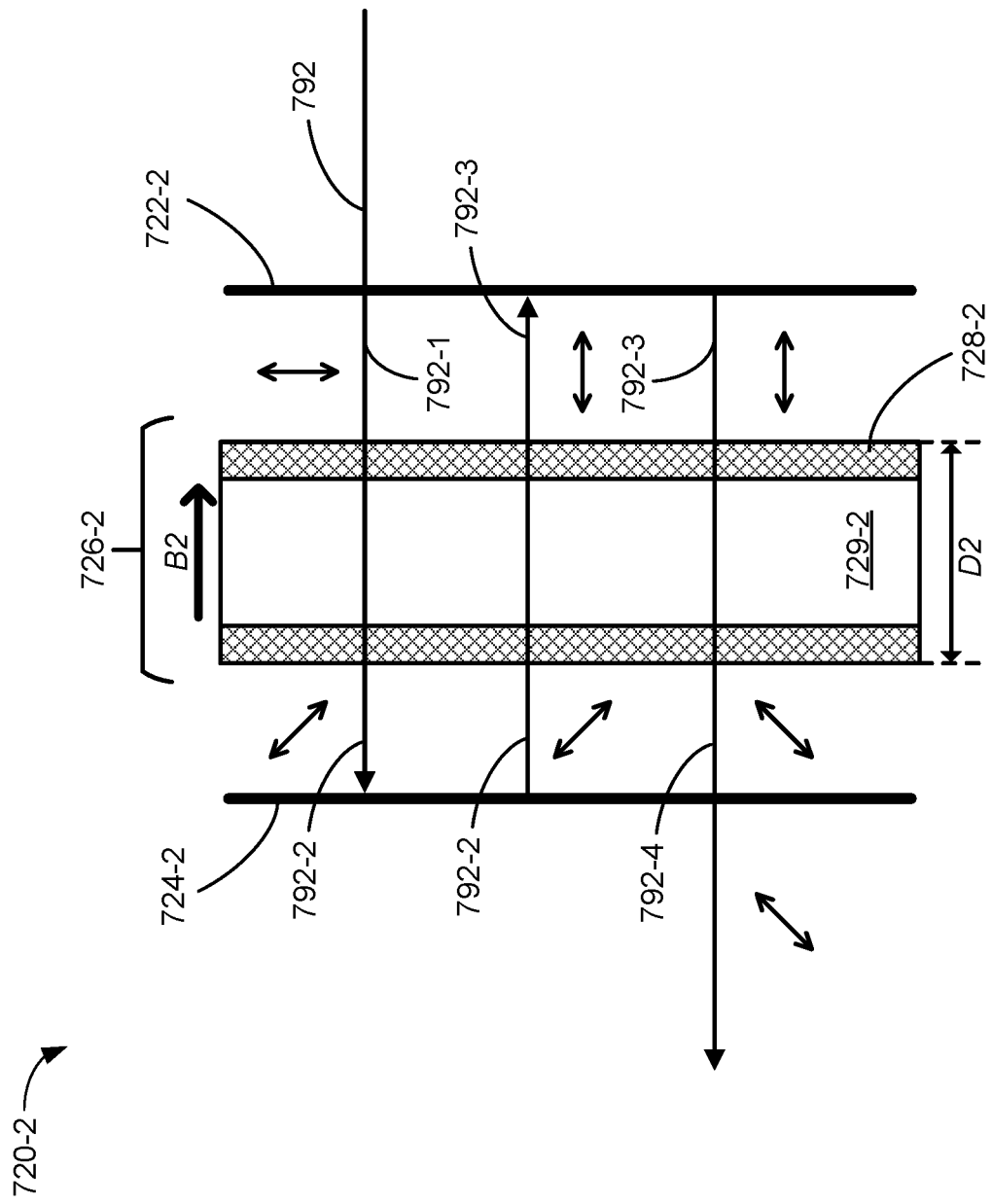
Figure 7D:
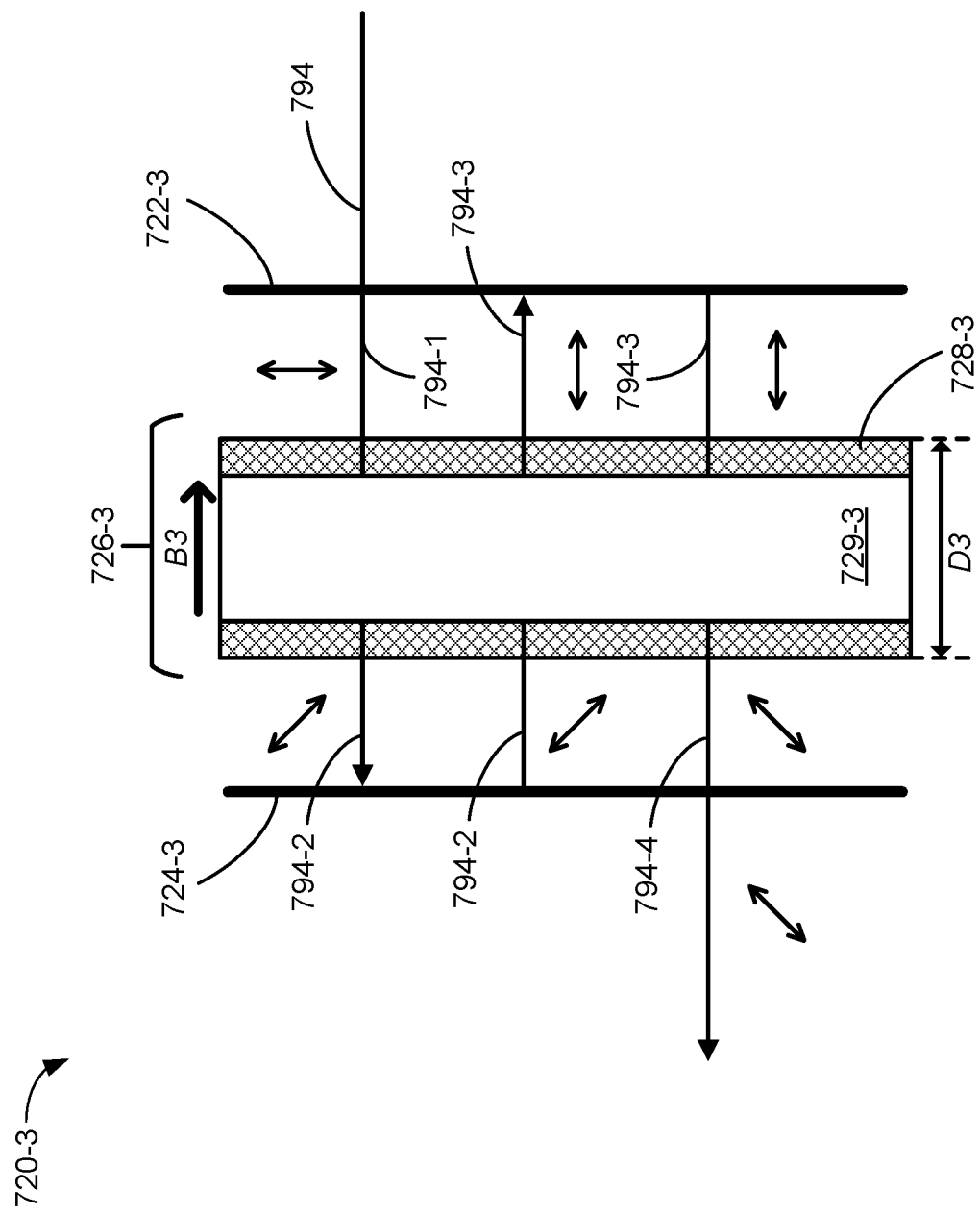

FIG. 7B is a schematic diagram of optical assembly 720-1 in accordance with some embodiments. FIG. 7C is a schematic diagram of optical assembly 720-2 in accordance with some embodiments. FIG. 7D is a schematic diagram of optical assembly 720-3 in accordance with some embodiments. Each of the optical assemblies 720-1, 720-2, and 720-3 is similar to optical assembly 420 shown in FIG. 4A.

Referring to FIG. 7B, the first optical assembly 720-1 includes a first reflector 722-1 (that corresponds to the first reflector 422 of optical assembly 420), a second reflector 724-1 (that corresponds to the second reflector 424 of optical assembly 420), and a first Faraday rotator 726-1 (that corresponds to the Faraday rotator 426 of optical assembly 420).

Referring to FIG. 7C, the second optical assembly 720-2 includes a third reflector 722-2 (that corresponds to the first reflector 422 of optical assembly 420), a fourth reflector 724-2 (that corresponds to the second reflector 424 of optical assembly 420), and a second Faraday rotator 726-2 (that corresponds to the Faraday rotator 426 of optical assembly 420).

Referring to FIG. 7D, the third optical assembly 720-3 includes a fifth reflector 722-3 (that corresponds to the first reflector 422 of optical assembly 420), a sixth reflector 724-3 (that corresponds to the second reflector 424 of optical assembly 420), and a third Faraday rotator 726-3 (that corresponds to the Faraday rotator 426 of optical assembly 420).

The optical path of each of the first image light 790, the second image light 792, and the third image light 794 in FIGS. 7B-7D is similar to the optical path of image light 490, described above with respect to FIG. 4A. For instance, each of the light 790-1, 792-1, and 794-1 corresponds to the first light 490-1; each of the light 790-2, 792-2, and 794-2 corresponds to the second light 490-2; each of the light 790-3, 792-3, and 794-3 corresponds to the third light 490-3; and each of the light 790-4, 792-4, and 794-3 corresponds to the fourth light 490-4. Details regarding the optical path of light 490-1 through 490-4 are not repeated here for brevity.

In some embodiments, the first optical assembly 720-1 may have a first Faraday rotator 726-1 that is different from a Faraday rotator 726-2 of the second optical assembly 720-2. For example, the optical assemblies 720-1, 720-2, and 720-3 may be configured for light having different wavelengths.

In some embodiments, the first Faraday rotator 726-1 includes an optically transparent material 728-1 that has a first thickness D1 and the second Faraday rotator 726-2 includes an optically transparent material 728-2 that has a second thickness D2 that is different from the first thickness D1. In some embodiments, the third Faraday rotator 726-3 includes an optically transparent material 728-3 that has a third thickness D3 that is different from the at least one of: the first thickness D1 and the second thickness D2.

In some embodiments, the first Faraday rotator 726-1 includes a magnet 729-1 that provides a first magnetic field (having a first magnetic flux density B1), the second Faraday rotator 726-2 includes a magnet 729-2 that provides a second magnetic field (having a second magnetic flux density B2) that is different from the first magnetic field (e.g., B1≠B2). In some embodiments, the third Faraday rotator 726-3 includes a magnet 729-3 that provides a third magnetic field (having a third magnetic flux density B3) that is different from at least one of: the first magnetic field and the second magnetic field (e.g., B3≠B1 and/or B3≠B2).

In some embodiments, the first optically transparent material 728-1, the second optically transparent material 728-2, and/or the third optically transparent material 728-3 is a different material (e.g., has a different material composition, has a different structure, has a different chemical composition). For example, the second optically transparent material 728-2 may be different from the first optically transparent material 728-1 (e.g., the first optically transparent material 728-1 is TGG and the second optically transparent material 728-2 is terbium doped flint glass). In some embodiments, the third optically transparent material is different from at least one of: the first optically transparent material and the second optically transparent material.

The first, second, and third Faraday rotators 726-1, 726-2, and 726-3 may be different from one another in any (e.g., one or more) of the ways described above. For example, the optically transparent material 728-1 of the first Faraday rotator 726-1 may be made of a different material and also have a different thickness compared to the optically transparent material 728-2 of the second Faraday rotator 726-2.

Figure 8A:
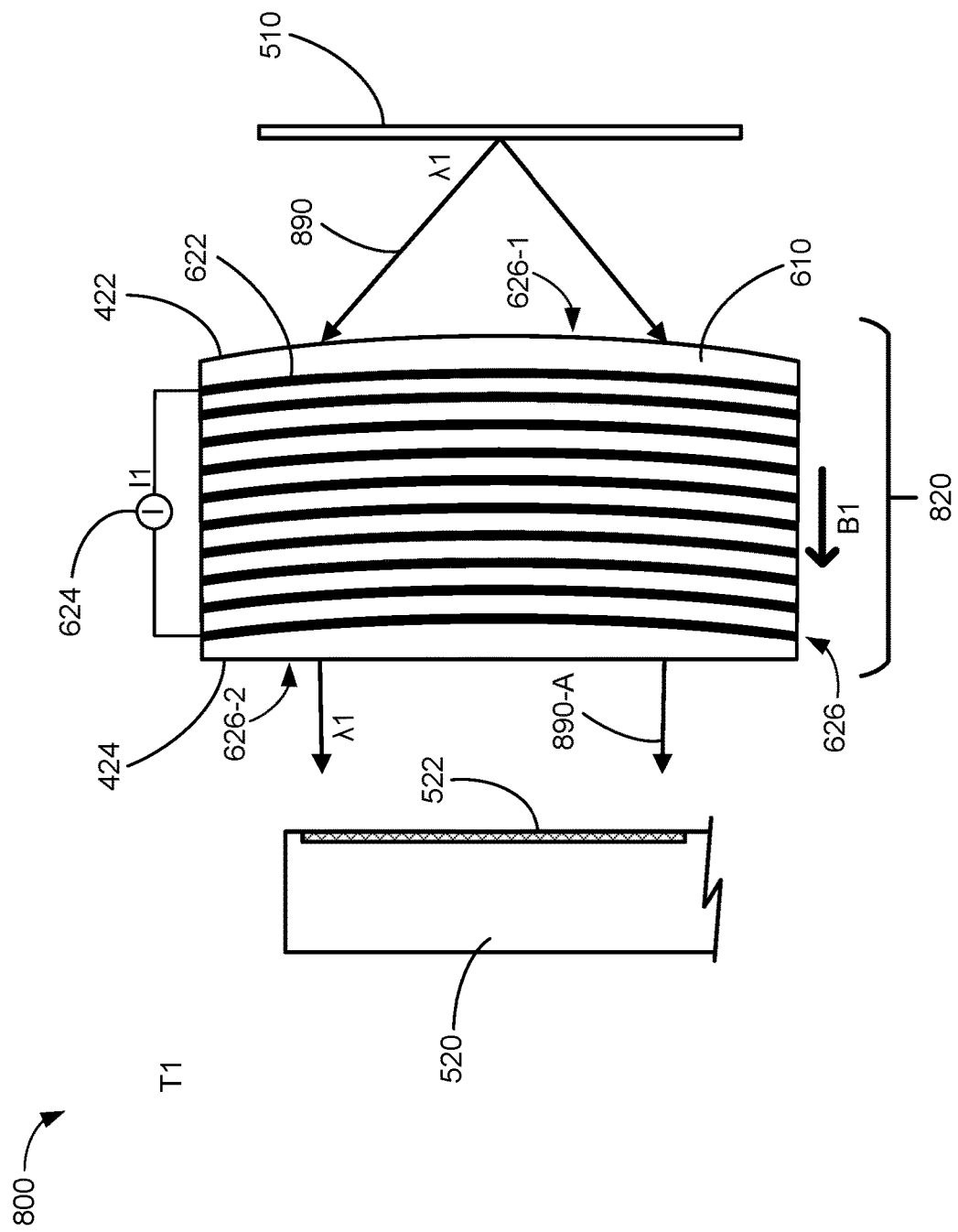
FIGS. 8A-8C illustrate time sequential operation of a display device that includes an electromagnetic Faraday rotator in accordance with some embodiments.
Figure 8B:
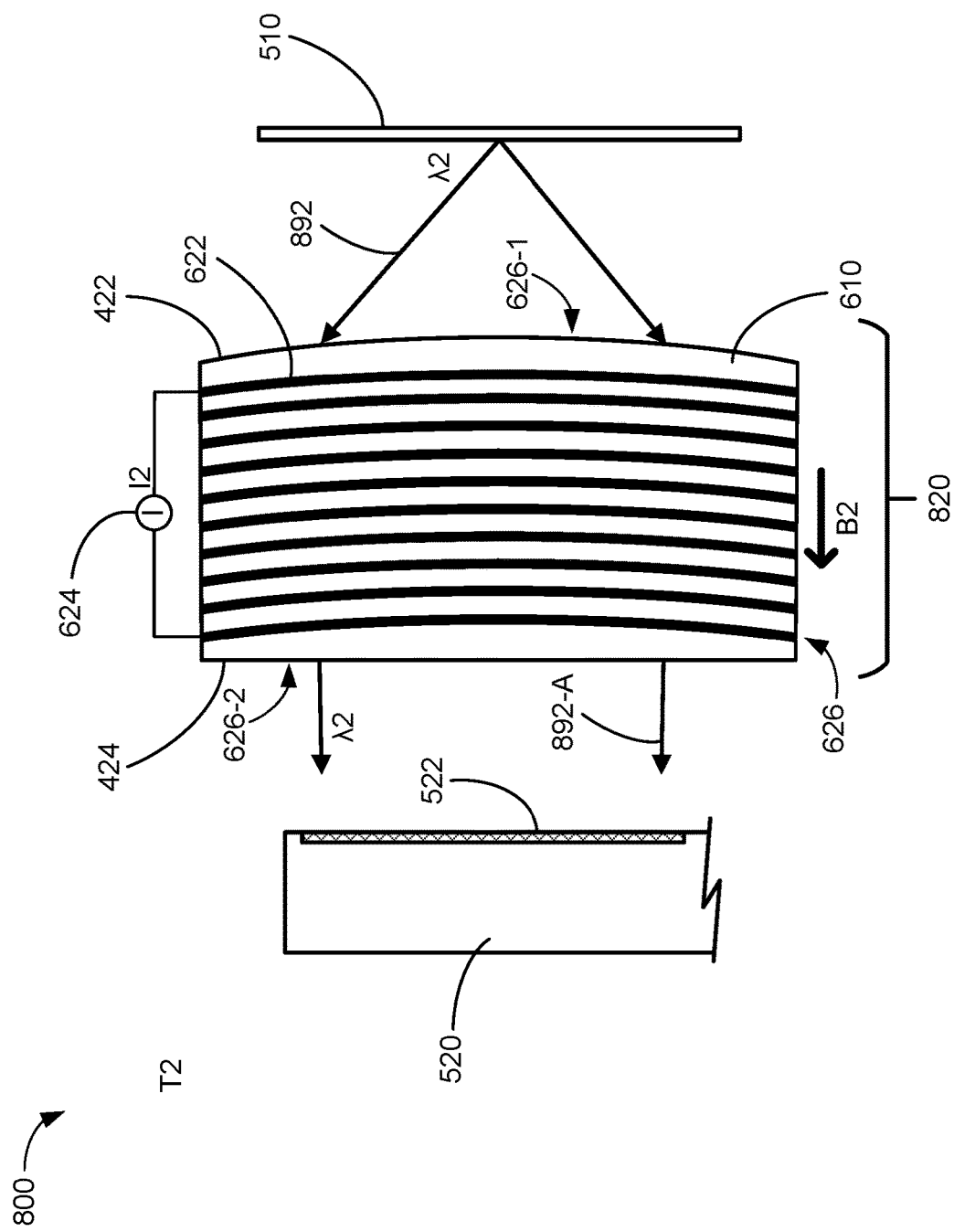
Figure 8C:
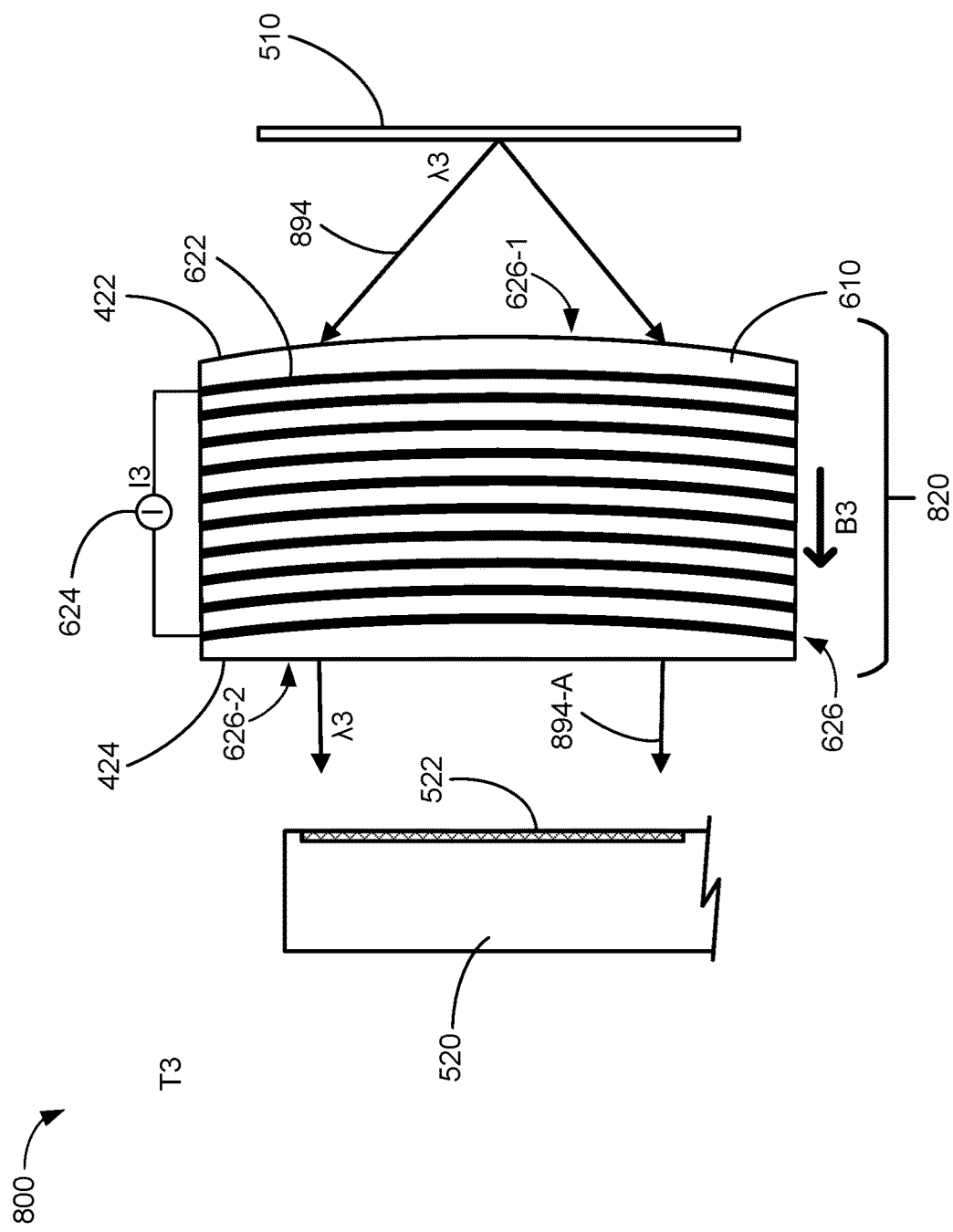

FIGS. 8A-8C illustrate time sequential operation of a display device 800 that includes an electromagnetic Faraday rotator 626 in accordance with some embodiments. Display device 800 illustrated in FIGS. 8A-8C is similar to display device 500 except that optical assembly 420 is replaced by optical assembly 820. Optical assembly 820 is similar to optical assembly 420 except that the Faraday rotator 426 (e.g., with a permanent magnet) is replaced by a Faraday rotator 626 with an electromagnet. Details regarding the Faraday rotator 626 with an electromagnet are described above with respect to FIG. 6C and are not repeated herein for brevity. In some embodiments, as shown, the first reflector 422 is disposed on a first surface 626-1 of the Faraday rotator 626 (e.g., as an optical coating), and the second reflector 424 is disposed on a second surface 626-2 of the Faraday rotator 626 (e.g., as an optical coating).

As shown in FIGS. 8A-8C, by adjusting the current provided to the wire 622, the electromagnetic Faraday rotator 626 is configured for a particular wavelength or a particular wavelength range. When the electromagnetic Faraday rotator 626 is coupled with a time-sequential display (e.g., a display configured to emit a first color at a first time, a second color at a second time subsequent to the first time, and a third color at a third time subsequent to the second time, the single electromagnetic Faraday rotator 626 can increase the optical path for light having different colors. This eliminates the need for using separate Faraday rotators for different colors and reduces the weight and size of a display device.

Referring to FIG. 8A, the current source 624 (or a voltage source) is configured to, at a first time (T1), provide a first electrical current I1 that passes through the wire 622 so that a magnetic field having a first magnetic flux density B1 is provided across the optically transparent material 610. The light source 510 is configured to, at the first time, provide (e.g., emit, output, generate) first image light 890 having wavelengths in a first wavelength range λ1. The first image light 890 is received by the optical assembly 820 and light 890-A (which corresponds to the first image light 890) is output from the optical assembly 820 toward the waveguide 520. At least a portion of the light 890-A is coupled into the waveguide 520 via the input coupler 522. The optical path of the first image light 890 corresponds to the optical path of the image light 490 described above with respect to FIG. 4A.

Referring to FIG. 8B, subsequent to transmitting the first image light 890 through the optical assembly 820, the current source 624 is configured to, at a second time (T2) distinct from the first time (T1), provide a second electrical current I2 that passes through the wire 622 so that a magnetic field having a second magnetic flux density B2 is provided across the optically transparent material 610. The light source 510 is configured to, at the second time, provide (e.g., emit, output, generate) second image light 892 having wavelengths in a second wavelength range λ2 that is different from the first wavelength range λ1. The second magnetic flux density B2 is different from the first magnetic flux density B1 and is proportional to the difference in the Verdet constant of the optically transparent material 610 for the first wavelength range λ1 and the Verdet constant of the optically transparent material 610 for the second wavelength range λ2 (e.g., $|B2-B1| \propto |V2-V1|$) so that a polarization of the second light 892, transmitted through the Faraday rotator 626 at the second time, experiences a same amount of rotation as the first light 890 transmitted through the Faraday rotator 626 at the first time. The second light 892 is received by the optical assembly 820 and light 892-A of (corresponding to the second light 892) is output from the optical assembly 820 toward the waveguide 520. At least a portion of the light 892-A is coupled into the waveguide 520 via the input coupler 522. The optical path of the second light 892 corresponds to the optical path of the image light 490 described above with respect to FIG. 4A.

Referring to FIG. 8C, subsequent to consecutively transmitting each of the first image light 890 and the second image light 892 through the optical assembly 820, the current source 624 is configured to, at a third time (T3) distinct from the first time and the second time, provide a third electrical current I3 that passes through the wire 622 so that a magnetic field having a third magnetic flux density B3 is provided across the optically transparent material 610. The light source 510 is configured to, at the third time, provide (e.g., emit, output, generate) third image light 894 having wavelengths in a third wavelength range λ3 that is different from each of the first wavelength range λ1 and the second wavelength range λ2. The third magnetic flux density B3 is different from the first magnetic flux density B1 and the second magnetic flux density B2. The third magnetic flux density is selected so that a polarization of the third image light 894, transmitted through the Faraday rotator 626 at the third time, experiences a same amount of rotation as the first image light 890 transmitted through the Faraday rotator 626 at the first time and the second image light 892 transmitted through the Faraday rotator 626 at the second time. The third image light 894 is received by the optical assembly 820 and light 894-A (corresponding to the third image light 894) is output from the optical assembly 820 toward the waveguide 520. At least a portion of light 894-A is coupled into the waveguide 520 via the input coupler 522. The optical path of the third image light 894 corresponds to the optical path of the image light 490 described above with respect to FIG. 4A.

Figure 9A:
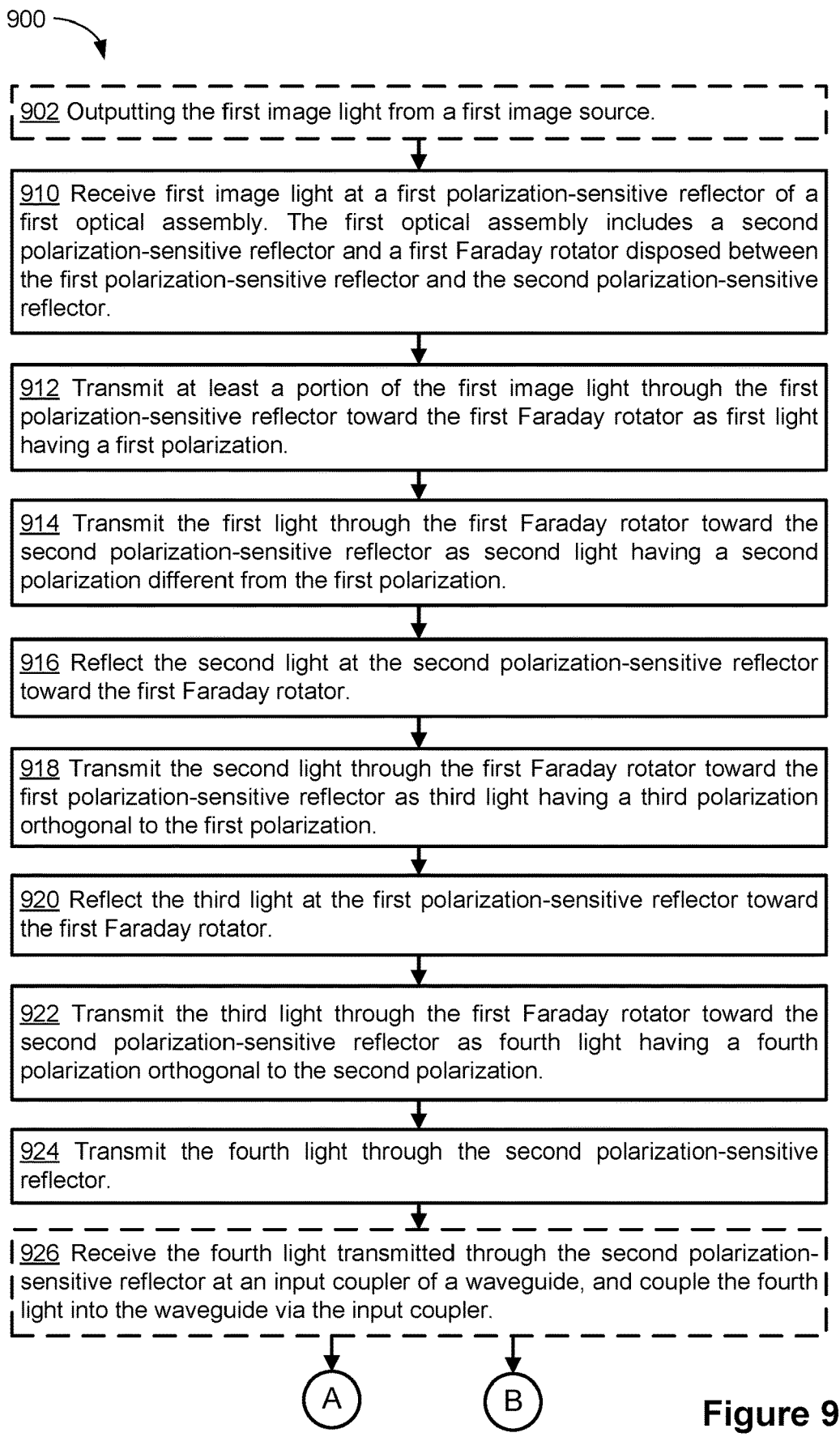
Figure 9C:
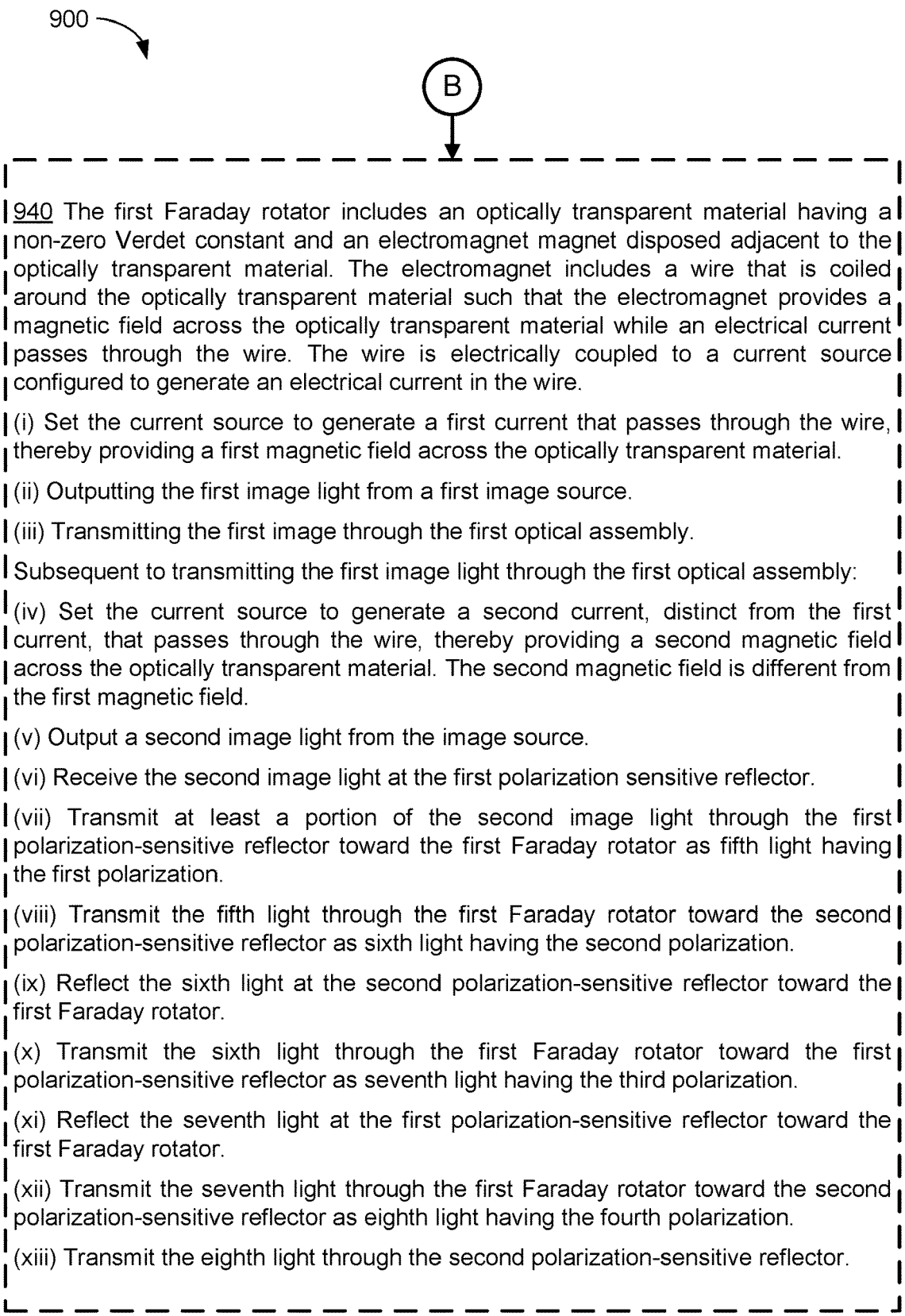

FIGS. 9A-9C is a flow chart of a method 900 of using a display device (e.g., display device 500, 700 or 800) in accordance with some embodiments.

The method 900 includes (step 910) receiving first image light 490 at a first polarization-sensitive reflector 422 of a first optical assembly (e.g., optical assembly 420, 720-1, or 820). The first optical assembly (e.g., optical assembly 420, 720-1, or 820) includes a second polarization-sensitive reflector 424 and a first Faraday rotator 426 or 626 that is disposed between the first polarization-sensitive reflector 422 and the second polarization-sensitive reflector 424.

In some embodiments, the method further includes (step 902) outputting the first image light from a first image source.

The method 900 also includes (step 912) transmitting at least a portion of the first image light 490 through the first reflector 422 toward the first Faraday rotator 426 or 626 as first light 490-1 having a first polarization.

The method further includes (step 914) transmitting the first light 490-1 through the first Faraday rotator 426 or 626 toward the second polarization-sensitive reflector 424 as second light 490-2 having a second polarization that is different from the first polarization, (step 916) reflecting the second light 490-2 at the second reflector 424 toward the first Faraday rotator 426 or 626, (step 918) transmitting the second light 490-2 through the first Faraday rotator 426 or 626 toward the first polarization-sensitive reflector 422 as third light 490-3 having a third polarization that is orthogonal to the first polarization, (step 920) reflecting the third light 490-3 at the first reflector 422 toward the first Faraday rotator 426 or 626, (step 922) transmitting the third light 490-3 through the first Faraday rotator 426 or 626 toward the second polarization-sensitive reflector 424 as fourth light 490-4 having a fourth polarization that is orthogonal to the second polarization, and (step 924) transmitting the fourth light 490-4 through the second polarization-sensitive reflector 424.

In some embodiments, the method 900 further includes (step 926) receiving the fourth light transmitted through the second polarization-sensitive reflector at an input coupler of a waveguide, and coupling the fourth light into the waveguide via the input coupler.

In some embodiments, the first image light (e.g., light 790-1) has wavelengths within a first wavelength range (e.g., first wavelength range λ1). The method (e.g., method 900) further includes (step 930), concurrently to transmitting the first image light through the first optical assembly (e.g., first optical assembly 720-1), (i) outputting second image light (e.g., second image light 792) from a second image source (e.g., second light source 710-2) that is distinct from the first image source (e.g., first light source 710-1). The second image light having wavelengths within a second wavelength range (e.g., second wavelength range λ2) that is different from the first wavelength range. The method also includes (ii) receiving the second image light at a third polarization-sensitive reflector (e.g., reflector 722-2) of a second optical assembly (e.g., second optical assembly 720-2). The second optical assembly includes a fourth polarization-sensitive reflector (e.g., reflector 724-2) and a second Faraday rotator (e.g., second Faraday rotator 726-2) that is disposed between the third polarization-sensitive reflector and the fourth polarization-sensitive reflector. The method further includes (iii) transmitting at least a portion of the second image light having the first polarization and wavelengths within the second wavelength range through the third polarization-sensitive reflector toward the second Faraday rotator as fifth light (e.g., light 792-1) having the first polarization, (iv) transmitting the fifth light through the second Faraday rotator toward the fourth polarization-sensitive reflector as sixth light (e.g., light 792-2) having the second polarization, (v) reflecting the sixth light at the fourth polarization-sensitive reflector toward the second Faraday rotator, (vi) transmitting the sixth light through the second Faraday rotator toward the third polarization-sensitive reflector as seventh light (e.g., light 792-3) having the third polarization, (vii) reflecting the seventh light at the third polarization-sensitive reflector toward the second Faraday rotator, (viii) transmitting the seventh light through the second Faraday rotator toward the fourth polarization-sensitive reflector as eighth light (e.g., light 792-4) having the fourth polarization, and (ix) transmitting the eighth light through the fourth polarization-sensitive reflector.

In some embodiments, the first Faraday rotator (e.g., Faraday rotator 626) includes an optically transparent material (e.g., optically transparent material 610) that has a non-zero Verdet constant and an electromagnet disposed adjacent to the optically transparent material. The electromagnet includes a wire (e.g., wire 622) that is coiled around the optically transparent material such that the electromagnet provides a magnetic field across the optically transparent material while an electrical current (e.g., electric current provided by current source 624) passes through the wire. The wire is electrically coupled to a current source (e.g., current source 624) that is configured to provide an electrical current to the wire. The first image light (e.g., first image light 890) has wavelengths within a first wavelength range (e.g., first wavelength range λ1). The method (e.g., method 900) includes (step 940) (i) setting the current source to provide (e.g., generate) a first current (e.g., current I1) that passes through the wire, thereby providing a first magnetic field (e.g., first magnetic having a first magnetic flux density B1) across the optically transparent material, (ii) outputting the first image light (e.g., first image light 890) from an image source (e.g., light source 510), and (iii) transmitting the first image light through the first optical assembly (e.g., the first optical assembly 720-1). The method also includes, (iv) subsequent to transmitting the first image light through the first optical assembly: (v) setting the current source to provide (e.g., generate) a second current (e.g., current I2), distinct from the first current, that passes through the wire, thereby providing a second magnetic field (e.g., second magnetic having a second magnetic flux density B2), that is different from the first magnetic field, across the optically transparent material. The method further includes (vi) outputting second image light (e.g., second image light 892) from the image source, (vii) receiving the second image light at the first polarization-sensitive reflector (e.g., first reflector 422), (viii) transmitting at least a portion of the second image light through the first polarization-sensitive reflector toward the first Faraday rotator as fifth light having the first polarization, (ix) transmitting the fifth light through the first Faraday rotator toward the second polarization-sensitive reflector (e.g., second reflector 424) as sixth light having the second polarization, (x) reflecting the sixth light at the second polarization-sensitive reflector toward the first Faraday rotator, (xi) transmitting the sixth light through the first Faraday rotator toward the first polarization-sensitive reflector as seventh light having the third polarization, (xii) reflecting the seventh light at the first polarization-sensitive reflector toward the first Faraday rotator, (xiii) transmitting the seventh light through the first Faraday rotator toward the second polarization-sensitive reflector as eighth light having the fourth polarization, and (xiv) transmitting the eighth light through the second polarization-sensitive reflector.

In light of these principles, we now turn to certain embodiments.

In accordance with some embodiments, an optical assembly (e.g., optical assembly 420, 720-1, and 820) includes a first polarization-sensitive reflector (e.g., first reflector 422) that is positioned to transmit light having a first polarization (e.g., s-polarized light or RCP) and reflect light having a second polarization (e.g., p-polarized light or LCP) that is orthogonal to the first polarization. The optical assembly also includes a second polarization-sensitive reflector (e.g., second reflector 424) that is positioned to reflect light having a third polarization (e.g., linear polarization at 45 degrees or first elliptical polarization) that is different from each of the first polarization and the second polarization, and transmit light having a fourth polarization (e.g., linear polarization at 135 degrees or second elliptical polarization) that is orthogonal to the third polarization. The optical assembly also includes a Faraday rotator (e.g., Faraday rotator 426 or 626) that is disposed between the first polarization-sensitive reflector and the second polarization-sensitive reflector so that the Faraday rotator converts: (i) the light (e.g., first light 490-1) having the first polarization into the light (e.g., second light 490-2) having the third polarization, (ii) the light (e.g., second light 490-2) having the third polarization into the light (e.g., third light 490-3) having the second polarization, and (iii) the light (e.g., third light 490-3) having the second polarization into the light (e.g., fourth light 490-4) having the fourth polarization.

In some embodiments, at least one of the first polarization-sensitive reflector (e.g., first reflector 422) or the second polarization-sensitive reflector (e.g., second reflector 424) is a reflective polarizer for reflecting light having a particular linear polarization. For example, a reflective polarizer may be configured to transmit light having s-polarization and reflect light having p-polarization. In a second example, a reflective polarizer may be configured to reflect light having a linear polarization at 45° and transmit light having a linear polarization at 135°.

In some embodiments, at least one of the first polarization-sensitive reflector (e.g., first reflector 422) or the second polarization-sensitive reflector (e.g., second reflector 424) includes a layer of cholesteric liquid crystals (CLC) and the first and second polarization are circular polarizations. For example, the first polarization may be LCP and the second polarization may be RCP, or vice versa.

In some embodiments, the third polarization differs from the first polarization by a phase that is (2n−1)*pi/4, n being an integer. For example, the first polarization and the third polarization may be linear polarizations and the third polarization differs from the first polarization (e.g., s-polarization or p-polarization) by a 45° rotation or a 135° rotation. In second example, the first polarization may be a circular polarization (e.g., RCP or LCP) and the third polarization is an elliptical polarization that is phase shifted (e.g., an electric field is phase-shifted relative to an orthogonal electric field) by 45° (e.g., π/4) or 135° (e.g., 3π/4).

In some embodiments, the Faraday rotator (e.g., Faraday rotator 426 or 626) includes a first surface (e.g., first surface 610-1 of optically transparent material 610) and a second surface (e.g., second surface 610-2 of optically transparent material 610) that is opposite to the first surface. The first polarization-sensitive reflector (e.g., first reflector 422) is disposed on the first surface of the Faraday rotator and the second polarization-sensitive reflector (e.g., second polarization-sensitive reflector 424) is disposed on the second surface of the Faraday rotator.

In some embodiments, the Faraday rotator (e.g., Faraday rotator 426) includes an optically transparent material (e.g., optically transparent material 610) that has a non-zero Verdet constant, and a magnet (e.g., magnet 620) located adjacent to the optically transparent material such that the magnet provides a non-zero magnetic field across the optically transparent material (e.g., a magnetic field that has a non-zero magnetic flux density in a direction along an optical axis 699 that intersects the first surface 610-1 of optically transparent material 610 and the second surface 610-2 of optically transparent material 610).

In some embodiments, the Faraday rotator (e.g., Faraday rotator 626) includes an optically transparent material (e.g., optically transparent material 610) that has a non-zero Verdet constant and an electromagnet that is disposed adjacent to the optically transparent material. The electromagnet includes a wire (e.g., wire 622) that is coiled around the optically transparent material such that the electromagnet provides a magnetic field across the optically transparent material while an electrical current (e.g., electrical current provided by current source 624) passes through the wire.

In accordance with some embodiments, a display device (e.g., display device 500, 700, or 800) includes one or more image sources (e.g., light sources 510 or 710; such as an image source, a display, or projector) configured to provide first image light (e.g., image light 490 or first image light 790), and a first optical assembly (e.g., optical assembly 420, 720, or 820). The optical assembly includes a first polarization-sensitive reflector (e.g., first reflector 422), a second polarization-sensitive reflector (e.g., second reflector 424), and a first Faraday rotator (e.g., Faraday rotator 426 or 626). The first Faraday rotator is disposed between the first polarization-sensitive reflector and the second polarization-sensitive reflector such that: (i) at least a portion of the first image light (e.g., image light 490) having a first polarization (e.g., s-polarization) is transmitted through the first polarization-sensitive reflector as first light (e.g., first light 490-1), and the first light is transmitted through the first Faraday rotator toward the second polarization-sensitive reflector as second light (e.g., second light 490-2) having a second polarization (e.g., linear polarization at 45°) different from the first polarization; (ii) the second light is reflected by the second polarization-sensitive reflector toward the first Faraday rotator and transmitted through the first Faraday rotator toward the first polarization-sensitive reflector as third light (e.g., third light 490-3) having a third polarization (e.g., p-polarization) that is orthogonal to the first polarization; (iii) the third light is reflected by the first polarization-sensitive reflector toward the first Faraday rotator and transmitted through the first Faraday rotator toward the second polarization-sensitive reflector as fourth light (e.g., fourth light 490-4) having a fourth polarization (e.g., linear polarization at 135) that is orthogonal to the second polarization, and (iv) the fourth light is transmitted through the second polarization-sensitive reflector.

In some embodiments, the display device (e.g., display device 500, 700, or 800) also includes a waveguide (e.g., waveguide 520) that includes an input coupler (e.g., input coupler 522). The first optical assembly (e.g., optical assembly 420, 720, or 820) being disposed relative to one or more image sources (e.g., light source 510 or 710) and the waveguide such that the fourth light (e.g., fourth light 490-4) is coupled into the waveguide via the input coupler.

In some embodiments, the display device (e.g., display device 500, 700, or 800) also includes one or more optical elements (e.g., one or more optical elements 530 which may include a focusing and/or defocusing optical element such as a lens) that is disposed between the image source (e.g., light source 510) and the first optical assembly (e.g., optical assembly 420, 720, or 820).

In some embodiments, the first image light (e.g., the first image light 790) includes light having wavelengths within a first wavelength range (e.g., first wavelength range λ1), and the one or more image sources (e.g., light sources 710-1, 710-2, 710-3) is further configured to provide second image light (e.g., second image light 792) having wavelengths in a second wavelength range (e.g., second wavelength range λ2) that is different from the first wavelength range. The display device also includes a second optical assembly (e.g., second optical assembly 720-2) that includes a third polarization-sensitive reflector (e.g., reflector 722-2), a fourth polarization-sensitive reflector (e.g., reflector 724-2), and a second Faraday rotator (e.g., second Faraday rotator 726-2). The second Faraday rotator is disposed between the third polarization-sensitive reflector and the fourth polarization-sensitive reflector such that: (i) at least a portion of the second image light having the first polarization is transmitted through the third polarization-sensitive reflector as fifth light (e.g., light 792-1), (ii) the fifth light is transmitted through the second Faraday rotator toward the fourth polarization-sensitive reflector as sixth light (e.g., light 792-2) having the second polarization, (iii) the sixth light is reflected by the fourth polarization-sensitive reflector toward the second Faraday rotator and transmitted through the second Faraday rotator toward the third polarization-sensitive reflector as seventh light (e.g., light 792-3) having the third polarization, (iv) the seventh light is reflected by the third polarization-sensitive reflector toward the second Faraday rotator and transmitted through the second Faraday rotator toward the fourth polarization-sensitive reflector as eighth light (e.g., light 792-4) having the fourth polarization, and the eighth light is transmitted through the fourth polarization-sensitive reflector.

In some embodiments, the one or more image sources (e.g., light sources 710-1, 710-2, 710-3) is further configured to provide third image light (e.g., third image light 794) having wavelengths in a third wavelength range (e.g., third wavelength range λ3) that is different from each of the first wavelength range (e.g., first wavelength range λ1) and the second wavelength range (e.g., second wavelength range λ2). The display device also includes a third optical assembly (e.g., third optical assembly 720-3) that includes a fifth polarization-sensitive reflector (e.g., reflector 722-3), a sixth polarization-sensitive reflector (e.g., reflector 724-3), and a third Faraday rotator (e.g., third Faraday rotator 726-3). The third Faraday rotator is disposed between the fifth polarization-sensitive reflector and the sixth polarization-sensitive reflector such that: (i) at least a portion of the third image light having the first polarization is transmitted through the fifth polarization-sensitive reflector as ninth light (e.g., light 794-1), (ii) the ninth light is transmitted through the third Faraday rotator toward the sixth polarization-sensitive reflector as tenth light (e.g., light 792-2) having the second polarization, (iii) the tenth light is reflected by the sixth polarization-sensitive reflector toward the third Faraday rotator and transmitted through the third Faraday rotator toward the fifth polarization-sensitive reflector as eleventh light (e.g., light 792-3) having the third polarization, (iv) the eleventh light is reflected by the fifth polarization-sensitive reflector toward the third Faraday rotator and transmitted through the third Faraday rotator toward the sixth polarization-sensitive reflector as twelfth light (e.g., light 792-4) having the fourth polarization, and the twelfth light is transmitted through the sixth polarization-sensitive reflector.

In some embodiments, the one or more image sources (e.g., light sources 710-1, 710-2, 710-3) includes a first image source (e.g., light source 710-1) that is configured to provide the first image light (e.g., first image light 790), and a second image source (e.g., second light source 710-2), distinct from the first image source, configured to provide the second image light (e.g., second image light 792). In some embodiments, the one or more image sources also includes a third image source (e.g., third light source 710-3), distinct from each of the first image source and the second image source, that is configured to provide the third image light (e.g., third image light 794).

In some embodiments, the first Faraday rotator (e.g., Faraday rotator 626) includes an optically transparent material (e.g., optically transparent material 610) that has a non-zero Verdet constant and an electromagnet disposed adjacent to the optically transparent material. The electromagnet includes a wire (e.g., wire 622) that is coiled around the optically transparent material such that the electromagnet provides a magnetic field across the optically transparent material while an electrical current (e.g., electric current provided by current source 624) passes through the wire.

In some embodiments, the first Faraday rotator (e.g., Faraday rotator 626) includes an optically transparent material (e.g., optically transparent material 610) that has a non-zero Verdet constant and a magnet (e.g., magnet 620) that is disposed adjacent to the optically transparent material such that the magnet provides a magnetic field across the optically transparent material.

In some embodiments, at least a portion of the waveguide (e.g., waveguide 360) is configured to transmit at least a portion of ambient light (e.g., ambient light 392). In such cases, both the image light (e.g., image light 390) and at least a portion of ambient light are transmitted toward a user's eye, thereby providing one or more augmented reality scenes.

In accordance with some embodiments, a method (e.g., method 900) includes (step 910) receiving first image light (e.g., first image light 490, 790, or 890) at a first polarization-sensitive reflector (e.g., first reflector 422 or 722) of a first optical assembly (e.g., optical assembly 420, 720-1, or 820). The first optical assembly also includes a second polarization-sensitive reflector (e.g., second reflector 424 or 724) and a first Faraday rotator (e.g., Faraday rotator 426, 626, or 726-1) that is disposed between the first polarization-sensitive reflector and the second polarization-sensitive reflector. The method also includes (step 912) transmitting at least a portion of the first image light through the first polarization-sensitive reflector toward the first Faraday rotator as first light (e.g., light 490-1 or 790-1) having a first polarization, (step 914) transmitting the first light through the first Faraday rotator toward the second polarization-sensitive reflector as second light (e.g., light 490-2 or 790-2) having a second polarization different from the first polarization, (step 916) reflecting the second light at the second polarization-sensitive reflector toward the first Faraday rotator, (step 918) transmitting the second light through the first Faraday rotator toward the first polarization-sensitive reflector as third light (e.g., light 490-3 or 790-3) having a third polarization orthogonal to the first polarization, (step 920) reflecting the third light at the first polarization-sensitive reflector toward the first Faraday rotator, (step 922) transmitting the third light through the first Faraday rotator toward the second polarization-sensitive reflector as fourth light (e.g., light 490-4 or 790-4) having a fourth polarization orthogonal to the second polarization, and (step 924) transmitting the fourth light through the second polarization-sensitive reflector.

In some embodiments, the method (e.g., method 900) further includes (step 926) receiving the fourth light (e.g., light 490-4 or 790-4) transmitted through the second polarization-sensitive reflector at an input coupler (e.g., input coupler 522) of a waveguide (e.g., waveguide 520), and coupling the fourth light into the waveguide via the input coupler.

In some embodiments, the method (e.g., method 900) further includes (step 902) outputting the first image light (e.g., light 490 or 790) from a first image source (e.g., light source 510 or 710-1).

In some embodiments, (step 930) the first image light (e.g., first image light 790) has wavelengths within a first wavelength range (e.g., first wavelength range λ1). The method (e.g., method 900) further includes, concurrent to transmitting the first image light through the first optical assembly (e.g., first optical assembly 720-1), (i) outputting second image light (e.g., second image light 792) from a second image source (e.g., second light source 710-2) that is distinct from the first image source. The second image light has wavelengths within a second wavelength range (e.g., second wavelength range 2) that is different from the first wavelength range. The method also includes (ii) receiving the second image light at a third polarization-sensitive reflector (e.g., reflector 722-2) of a second optical assembly (e.g., second optical assembly 720-2). The second optical assembly further includes a fourth polarization-sensitive reflector (e.g., reflector 724-2) and a second Faraday rotator (e.g., second Faraday rotator 726-2) that is disposed between the third polarization-sensitive reflector and the fourth polarization-sensitive reflector. The method also includes: (iii) transmitting at least a portion of the second image light having the first polarization and wavelengths within the second wavelength range through the third polarization-sensitive reflector toward the second Faraday rotator as fifth light (e.g., light 792-1) having the first polarization, (iv) transmitting the fifth light through the second Faraday rotator toward the fourth polarization-sensitive reflector as sixth light (e.g., light 792-2) having the second polarization, (v) reflecting the sixth light at the fourth polarization-sensitive reflector toward the second Faraday rotator (vi) transmitting the sixth light through the second Faraday rotator toward the third polarization-sensitive reflector as seventh light (e.g., light 792-3) having the third polarization (vi) reflecting the seventh light at the third polarization-sensitive reflector toward the second Faraday rotator, (vii) transmitting the seventh light through the second Faraday rotator toward the fourth polarization-sensitive reflector as eighth light (e.g., light 792-4) having the fourth polarization; and (ix) transmitting the eighth light through the fourth polarization-sensitive reflector.

In some embodiments, (step 940) the first Faraday rotator (e.g., Faraday rotator 626) includes an optically transparent material (e.g., optically transparent material 610) that has a non-zero Verdet constant and an electromagnet that is disposed adjacent to the optically transparent material. The electromagnet includes a wire (e.g., wire 622) that is coiled around the optically transparent material such that the electromagnet provides a magnetic field across the optically transparent material while an electrical current passes through the wire. The wire is electrically coupled to a current source (e.g., current source 624) that is configured to provide an electrical current in the wire. The first image light (e.g., image light 890) has wavelengths within a first wavelength range (e.g., first wavelength range $\lambda 1$). The method (e.g., method 900) further includes: (i) setting the current source to provide a first current (e.g., first current I1) that passes through the wire, thereby providing a first magnetic field (e.g., first magnetic field having a first magnetic flux density B1) across the optically transparent material; (ii) outputting the first image light from an image source (e.g., light source 510); and (iii) transmitting the first image light through the first optical assembly (e.g., optical assembly 820). The method further includes, (iv) subsequent to transmitting the first image light through the first optical assembly: (v) setting the current source to provide a second current (e.g., second current I2), distinct from the first current, that passes through the wire, thereby providing a second magnetic field (e.g., second magnetic field having a second magnetic flux density B2) across the optically transparent material. The second magnetic field has a different magnitude than the first magnetic field (e.g., B1≠B2). The method also includes: (vi) outputting second image light (e.g., light 892) from the image source, (vii) receiving the second image light at the first polarization-sensitive reflector, (viii) transmitting at least a portion of the second image light through the first polarization-sensitive reflector toward the first Faraday rotator as fifth light having the first polarization, (ix) transmitting the fifth light through the first Faraday rotator toward the second polarization-sensitive reflector as sixth light having the second polarization (x) reflecting the sixth light at the second polarization-sensitive reflector toward the first Faraday rotator, (xi) transmitting the sixth light through the first Faraday rotator toward the first polarization-sensitive reflector as seventh light having the third polarization, (xii) reflecting the seventh light at the first polarization-sensitive reflector toward the first Faraday rotator, (xiii) transmitting the seventh light through the first Faraday rotator toward the second polarization-sensitive reflector as eighth light (e.g., light 892-A) having the fourth polarization, and (xiv) transmitting the eighth light through the second polarization-sensitive reflector.

In some embodiments, the method (e.g., method 900) further includes, subsequent to transmitting the first image light (e.g., image light 890) and the second image light (e.g., image light 892) through the first optical assembly: setting the current source to provide a third current (e.g., third current I3), distinct from the first current and the second current, that passes through the wire, thereby providing a third magnetic field (e.g., third magnetic field having a third magnetic flux density B3) across the optically transparent material. The third magnetic field has a different magnitude than the first magnetic field and the second magnetic field (e.g., B3≠B2≠B1). The method also includes: outputting third image light (e.g., light 894) from the image source, (vii) receiving the second image light at the first polarization-sensitive reflector, (viii) transmitting at least a portion of the second image light through the first polarization-sensitive reflector toward the first Faraday rotator as fifth light having the first polarization, (ix) transmitting the fifth light through the first Faraday rotator toward the second polarization-sensitive reflector as sixth light having the second polarization (x) reflecting the sixth light at the second polarization-sensitive reflector toward the first Faraday rotator, (xi) transmitting the sixth light through the first Faraday rotator toward the first polarization-sensitive reflector as seventh light having the third polarization, (xii) reflecting the seventh light at the first polarization-sensitive reflector toward the first Faraday rotator, (xiii) transmitting the seventh light through the first Faraday rotator toward the second polarization-sensitive reflector as eighth light (e.g., light 894-A) having the fourth polarization, and (xiv) transmitting the eighth light through the second polarization-sensitive reflector.

In some embodiments, the method (e.g., method 900) further includes transmitting, through at least a portion of the waveguide (e.g., waveguide 360, 520) at least a portion of ambient light (e.g., ambient light 392) toward an eye (e.g., eye 340) of a user. The image light (e.g., image light 390) and the portion of the ambient light transmitted to the eye collectively provide one or more augmented reality scenes.

In accordance with some embodiments, an optical assembly includes a first polarization-sensitive reflector, a second polarization-sensitive reflector, and a Faraday rotator disposed between the first polarization-sensitive reflector and the second polarization-sensitive reflector to provide a folded optical path between the first polarization-sensitive reflector and the second polarization-sensitive reflector for light having a particular polarization and impinging on the first polarization-sensitive reflector.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
a first polarization-sensitive reflector positioned to:
transmit light having a first polarization; and
reflect light having a second polarization orthogonal to the first polarization;
a second polarization-sensitive reflector positioned to:
reflect light having a third polarization that is different from the first polarization and the second polarization; and
transmit light having a fourth polarization orthogonal to the third polarization; and
a Faraday rotator disposed between the first polarization-sensitive reflector and the second polarization-sensitive reflector so that the Faraday rotator converts:
the light having the first polarization into the light having the third polarization;
the light having the third polarization into the light having the second polarization; and
the light having the second polarization into the light having the fourth polarization.

2. The optical assembly of claim 1, wherein at least one of the first polarization-sensitive reflector or the second polarization-sensitive reflector is a reflective polarizer.

3. The optical assembly of claim 1, wherein at least one of the first polarization-sensitive reflector or the second polarization-sensitive reflector includes a layer of cholesteric liquid crystals.

4. The optical assembly of claim 1, wherein the third polarization differs from the first polarization by a phase that is $(2n-1)*pi/4$, n being an integer.

5. The optical assembly of claim 1, wherein:
the Faraday rotator includes a first surface and a second surface; and
the first polarization-sensitive reflector is disposed on the first surface of the Faraday rotator and the second polarization-sensitive reflector is disposed on the second surface of the Faraday rotator.

6. The optical assembly of claim 1, wherein the Faraday rotator includes:
an optically transparent material having a non-zero Verdet constant; and
a magnet located adjacent to the optically transparent material such that the magnet provides a magnetic field across the optically transparent material.

7. The optical assembly of claim 1, wherein the Faraday rotator includes an optically transparent material having a non-zero Verdet constant and an electromagnet disposed adjacent to the optically transparent material, the electromagnet including a wire that is coiled around the optically transparent material such that the electromagnet provides a magnetic field across the optically transparent material while an electrical current passes through the wire.

8. A display device, comprising:
one or more image sources configured to provide first image light; and
a first optical assembly including a first polarization-sensitive reflector, a second polarization-sensitive reflector, and a first Faraday rotator disposed between the first polarization-sensitive reflector and the second polarization-sensitive reflector such that:
at least a portion of the first image light having a first polarization is transmitted through the first polarization-sensitive reflector as first light, and the first light is transmitted through the first Faraday rotator toward the second polarization-sensitive reflector as second light having a second polarization different from the first polarization;
the second light is reflected by the second polarization-sensitive reflector toward the first Faraday rotator and transmitted through the first Faraday rotator toward the first polarization-sensitive reflector as third light having a third polarization orthogonal to the first polarization;
the third light is reflected by the first polarization-sensitive reflector toward the first Faraday rotator and transmitted through the first Faraday rotator toward the second polarization-sensitive reflector as fourth light having a fourth polarization orthogonal to the second polarization; and
the fourth light is transmitted through the second polarization-sensitive reflector.

9. The display device of claim 8, further comprising a waveguide, the waveguide including an input coupler, the first optical assembly being disposed relative to one or more image sources and the waveguide such that the fourth light is coupled into the waveguide via the input coupler.

10. The display device of claim 8, further comprising one or more optical elements disposed between the one or more image sources and the first optical assembly.

11. The display device of claim 8, wherein the first image light includes light having wavelengths within a first wavelength range, and the one or more image sources is further configured to provide second image light having wavelengths in a second wavelength range different from the first wavelength range, the display device further comprising:
a second optical assembly including a third polarization-sensitive reflector, a fourth polarization-sensitive reflector, and a second Faraday rotator disposed between the third polarization-sensitive reflector and the fourth polarization-sensitive reflector such that:
at least a portion of the second image light having the first polarization is transmitted through the third polarization-sensitive reflector as fifth light;
the fifth light is transmitted through the second Faraday rotator toward the fourth polarization-sensitive reflector as sixth light having the second polarization;
the sixth light is reflected by the fourth polarization-sensitive reflector toward the second Faraday rotator and transmitted through the second Faraday rotator toward the third polarization-sensitive reflector as seventh light having the third polarization;
the seventh light is reflected by the third polarization-sensitive reflector toward the second Faraday rotator and transmitted through the second Faraday rotator toward the fourth polarization-sensitive reflector as eighth light having the fourth polarization; and
the eighth light is transmitted through the fourth polarization-sensitive reflector.

12. The display device of claim 11, wherein the one or more image sources includes:
a first image source configured to provide the first image light; and
a second image source, distinct from the first image source, configured to provide the second image light.

13. The display device of claim 8, wherein:
the first Faraday rotator includes an optically transparent material having a non-zero Verdet constant and an electromagnet disposed adjacent to the optically transparent material, the electromagnet including a wire that is coiled around the optically transparent material such that the electromagnet provides a magnetic field across the optically transparent material while an electrical current passes through the wire.

14. The display device of claim 8, wherein:
the first Faraday rotator includes an optically transparent material having a non-zero Verdet constant and a magnet disposed adjacent to the optically transparent material such that the magnet provides a magnetic field across the optically transparent material.

15. A method, comprising:
receiving first image light at a first polarization-sensitive reflector of a first optical assembly, the first optical assembly having a second polarization-sensitive reflector and a first Faraday rotator disposed between the first polarization-sensitive reflector and the second polarization-sensitive reflector;
transmitting at least a portion of the first image light through the first polarization-sensitive reflector toward the first Faraday rotator as first light having a first polarization;
transmitting the first light through the first Faraday rotator toward the second polarization-sensitive reflector as second light having a second polarization different from the first polarization;
reflecting the second light at the second polarization-sensitive reflector toward the first Faraday rotator;
transmitting the second light through the first Faraday rotator toward the first polarization-sensitive reflector as third light having a third polarization orthogonal to the first polarization;
reflecting the third light at the first polarization-sensitive reflector toward the first Faraday rotator;
transmitting the third light through the first Faraday rotator toward the second polarization-sensitive reflector as fourth light having a fourth polarization orthogonal to the second polarization; and
transmitting the fourth light through the second polarization-sensitive reflector.

16. The method of claim 15, further comprising:
receiving, at an input coupler of a waveguide, the fourth light transmitted through the second polarization-sensitive reflector; and
coupling the fourth light into the waveguide via the input coupler.

17. The method of claim 15, further comprising:
outputting the first image light from a first image source.

18. The method of claim 17, wherein the first image light has wavelengths within a first wavelength range, the method further comprising:
outputting second image light from a second image source distinct from the first image source, the second image light having wavelengths within a second wavelength range different from the first wavelength range;
receiving the second image light at a third polarization-sensitive reflector of a second optical assembly, the second optical assembly having a fourth polarization-sensitive reflector and a second Faraday rotator disposed between the third polarization-sensitive reflector and the fourth polarization-sensitive reflector;
transmitting at least a portion of the second image light having the first polarization and wavelengths within the second wavelength range through the third polarization-sensitive reflector toward the second Faraday rotator as fifth light having the first polarization;
transmitting the fifth light through the second Faraday rotator toward the fourth polarization-sensitive reflector as sixth light having the second polarization;
reflecting the sixth light at the fourth polarization-sensitive reflector toward the second Faraday rotator;
transmitting the sixth light through the second Faraday rotator toward the third polarization-sensitive reflector as seventh light having the third polarization;
reflecting the seventh light at the third polarization-sensitive reflector toward the second Faraday rotator;
transmitting the seventh light through the second Faraday rotator toward the fourth polarization-sensitive reflector as eighth light having the fourth polarization; and
transmitting the eighth light through the fourth polarization-sensitive reflector.

19. The method of claim 15, wherein:
the first Faraday rotator includes an optically transparent material having a non-zero Verdet constant and an electromagnet disposed adjacent to the optically transparent material, the electromagnet including a wire that is coiled around the optically transparent material such that the electromagnet provides a magnetic field across the optically transparent material while an electrical current passes through the wire.

20. The method of claim 19, wherein the wire is electrically coupled to a current source configured to provide an electrical current to the wire, and the first image light has wavelengths within a first wavelength range, the method further comprising:
setting the current source to provide a first current that passes through the wire, thereby providing a first magnetic field across the optically transparent material;
outputting the first image light from an image source;
transmitting the first image light through the first optical assembly; and
subsequent to transmitting the first image light through the first optical assembly:
setting the current source to provide a second current, distinct from the first current, that passes through the wire, thereby providing a second magnetic field across the optically transparent material, the second magnetic field being different than the first magnetic field;
outputting a second image light from the image source;
receiving the second image light at the first polarization-sensitive reflector;
transmitting at least a portion of the second image light through the first polarization-sensitive reflector toward the first Faraday rotator as fifth light having the first polarization;
transmitting the fifth light through the first Faraday rotator toward the second polarization-sensitive reflector as sixth light having the second polarization;
reflecting the sixth light at the second polarization-sensitive reflector toward the first Faraday rotator;
transmitting the sixth light through the first Faraday rotator toward the first polarization-sensitive reflector as seventh light having the third polarization;
reflecting the seventh light at the first polarization-sensitive reflector toward the first Faraday rotator;
transmitting the seventh light through the first Faraday rotator toward the second polarization-sensitive reflector as eighth light having the fourth polarization; and transmitting the eighth light through the second polarization-sensitive reflector.

\* \* \* \* \*